US006496819B1

(12) United States Patent
Bello et al.

(10) Patent No.: US 6,496,819 B1
(45) Date of Patent: Dec. 17, 2002

(54) REWRITING A QUERY IN TERMS OF A SUMMARY BASED ON FUNCTIONAL DEPENDENCIES AND JOIN BACKS, AND BASED ON JOIN DERIVABILITY

(75) Inventors: Randall Bello, Hampton, NH (US); James Finnerty, Lexington, MA (US); Mohamed Ziauddin, Fremont, CA (US); Andrew Witkowski, Foster City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/221,641

(22) Filed: Dec. 28, 1998

(51) Int. Cl.[7] .............................................. G06F 17/00
(52) U.S. Cl. ................................ 707/3; 707/4; 707/200
(58) Field of Search ...................... 707/1–206; 711/1–6, 711/200, 203; 709/1, 100; 717/1–11

(56) References Cited

U.S. PATENT DOCUMENTS

| 5,584,024 | A | | 12/1996 | Schwartz ........................ 707/4 |
| 5,734,884 | A | * | 3/1998 | Eberhard et al. ............ 707/200 |
| 5,812,840 | A | | 9/1998 | Schwartz ........................ 707/4 |
| 5,875,447 | A | * | 2/1999 | Goel et al. ...................... 707/4 |
| 5,897,632 | A | | 4/1999 | Dar et al. ....................... 707/2 |
| 5,970,482 | A | | 10/1999 | Pham et al. ................... 706/16 |
| 5,974,407 | A | | 10/1999 | Sacks ............................. 707/2 |
| 5,978,788 | A | * | 11/1999 | Castelli et al. ............... 707/102 |
| 5,991,754 | A | | 11/1999 | Raitto et al. .................... 707/2 |
| 6,006,216 | A | * | 12/1999 | Griffin et al. ................... 707/2 |
| 6,125,360 | A | | 9/2000 | Witkowski et al. ............. 707/2 |
| 6,134,543 | A | | 10/2000 | Witkowski et al. ............. 707/2 |
| 6,199,063 | B1 | | 3/2001 | Colby et al. .................... 707/4 |

OTHER PUBLICATIONS http://www.research.att.com/conf/vldb98/program.html, Mar. 2001.*

(List continued on next page.)

*Primary Examiner*—David Jung
(74) *Attorney, Agent, or Firm*—Marcel K. Bingham; Hickman Palermo Truong & Becker LLP

(57) ABSTRACT

A method and system is provided for processing queries. Specifically, techniques are provided for handling a query that does not reference a particular materialized view, where the query requires access to values from a particular column not contained in the materialized view. A technique is also provided for processing a query that does not reference a particular materialized aggregate view, where the materialized aggregate view specifies an outer join between a child table and a parent table and the query specifies a particular type of join between the child table and the parent table, where the particular type of join is one of an inner join, an anti-join and a semi-join. The query is rewritten to produce a rewritten query that accesses the materialized aggregate view to produce data required by the query. A technique is also provided for processing a query that does not reference a particular materialized view and that specifies that results are to be grouped by a first set of one or more columns, where the materialized view reflects data that is grouped by a second set of one or more columns. If each column in the first set of columns either exactly matches a column in the second set of columns, is functionally dependent on another column in the first set of columns, or is functionally dependent on a column in the second set of columns, then the query is rewritten to produce a rewritten query that references the materialized view.

30 Claims, 11 Drawing Sheets

OTHER PUBLICATIONS http://www.research.att.com/conf/vldb98, Mar. 2001.*
Bello et al., "Materialized Views in Oracle", VLDB '98, Proceedings of 24th International Conference on Very Large Data Bases, Aug. 24–27, 1998, New York City, New York, USA, pp. 659–664.*
Tanjar et al., "Aggregate–join query processing in parallel database systems"; May 14–17, 2000; High Performance Computing in the Asia–Pacific Region, 2000, Proceedings, The Fourth International Conference/Exhibition on, vol. 2, pp. 824–829.*
Proletti et al., "Analysis of range queries and self–spatial join queries on real region datasets stored using an R–tree"; Sep.–Oct., 2000; Knowledge and Data Engineering, IEEE Transaction, vol. 12, Issue 5, pp. 751–762.*
Najjar et al., "Cardinality estimation of distributed join queries"; Sep. 1–3, 1999; Database and Expert Systems Applications, 1999, Proceedings, Tenth International Workshop on, pp. 66–70.*

Chaudhuri, Surajit et al., "Optimizing Queries with Materialized Views", Proceedings of the Eleventh International Conference on Data Engineering, Mar. 6–10, 1995, pp. 190–200.
Gopalkrishnan, Vivekanand et al., "Issues of Object–Relational View in Data Warehousing Environment", 1998 IEEE International Conference on Systems, Man, and Cybernetics, Oct. 11–14, 1998, vol. 3, pp. 2732–2737.
Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.
Segev, Arie et al., "Maintaining Materialized Views in Distributed Databases", Proceedings of the Fifth International Conference on Data Engineering, Feb. 6–10, 1989, pp. 262–270.

* cited by examiner

Fact Table 800

| Fact_Key | Time_Key | Product_Key | Sales |
|---|---|---|---|
| 1 | A | X | $ 30 |
| 2 | B | Y | $ 90 |
| ⋮ | ⋮ | ⋮ | ⋮ |

FIG. 8A

Time Table 802

| Time_Key | Week | Month | Year | Month Info | Year Info |
|---|---|---|---|---|---|
| A | 1 | 1 / 98 | 1998 | Memo 1 | Memo 2 |
| B | 1 | 1 / 98 | 1998 | Memo 1 | Memo 2 |
| C | 2 | 1 / 98 | 1998 | Memo 1 | Memo 2 |
| ⋮ | ⋮ | ⋮ | ⋮ | | |

FIG. 8B

Time Table 804

| Time_Key | Week | Month |
|---|---|---|
| A | 1 | 1 / 98 |
| B | 1 | 1 / 98 |
| C | 2 | 1 / 98 |
| ⋮ | ⋮ | ⋮ |

Month Table 806

| Month | Year | Month Info |
|---|---|---|
| 1 / 98 | 1998 | Memo 1 |
| 2 / 98 | 1998 | Memo 3 |
| ⋮ | ⋮ | ⋮ |

Year Table 808

| Year | Year Info |
|---|---|
| 1998 | Memo 2 |
| 1999 | Memo 4 |
| ⋮ | ⋮ |

FIG. 8C

Fact 900

| Sales | Store |
|---|---|
| $2 | 1 |
| $4 | 1 |
| $6 | 1 |
| $8 | 2 |
| $10 | 2 |
| $12 | 3 |

Detail 902

| Store | Employees | City |
|---|---|---|
| 1 | Joe | NYC |
| 1 | Sue | NYC |
| 2 | Kim | SF |
| 2 | Tom | SF |
| 2 | Ed | SF |

FIG. 9A

Summary Table 904

| Store | Sum sales | City |
|---|---|---|
| 1 | $24 | NYC |
| 2 | $54 | SF |
| 3 | $12 | NULL |

FIG. 9B

Summary Table 906

| Store | Sumsales | Scaling factor | City |
|---|---|---|---|
| 1 | $24 | 2 | NYC |
| 2 | $54 | 3 | SF |
| 3 | $12 | 1 | NULL |

REWRITING A QUERY IN TERMS OF A SUMMARY BASED ON FUNCTIONAL DEPENDENCIES AND JOIN BACKS, AND BASED ON JOIN DERIVABILITY

FIELD OF THE INVENTION

The present invention relates to database systems, and in particular, to rewriting queries to access data sources that are not specifically referenced in the queries.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it may not be desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

A view is defined by metadata referred to as a view definition. The view definition contains mappings to one or more columns in the one or more tables containing the data. Typically, the view definition is in the form of a database query. Columns and tables that are mapped to a view are referred to herein as base columns and base tables of the view, respectively. The data maintained in the base columns is referred to herein as base data.

The data presented by conventional views is gathered and derived on-the-fly from the base tables in response to queries that access the views. That data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate from the base tables from which the data was originally gathered and derived. The data contained in a materialized view is referred to herein as ("materialized data"). Materialized views eliminate the overhead associated with gathering and deriving the view data every time a query accesses the view. As new data is periodically added to the base tables, the materialized view needs to be updated (i.e., refreshed) to reflect the new base data.

Materialized views that are derived from more than one base table are created by performing a join between the base tables. A join is a query that combines rows from two or more tables, views, or materialized views. A join is performed whenever multiple tables appear in a query's FROM clause. The query's select list can select any columns from any of the base tables listed in the FROM clause.

Most join queries contain WHERE clause conditions that compare two columns, each from a different table. Such a condition is called a join condition. To execute a join, the DBMS combines pairs of rows for which the join condition evaluates to TRUE, where each pair contains one row from each table.

To execute a join of three or more tables, the DBMS first joins two of the tables based on the join conditions comparing their columns and then joins the result to another table based on join conditions containing columns of the joined tables and the new table. The DBMS continues this process until all tables are joined into the result.

In addition to join conditions, the WHERE clause of a join query can also contain other conditions that refer to columns of only one table. These conditions can further restrict the rows returned by the join query.

An equijoin is a join with a join condition containing an equality operator. An equijoin combines rows that have equivalent values for the specified columns. Query1 is an equijoin that combines the rows of tables R and S where the value in column r.a is the same as the value in column s.a:

QUERY1

SELECT *
FROM R, S
WHERE r.a=s.a;

In this example, table R is the "left" or "child" side table of the join, and table S is the "right" or "parent" table of the join. The join illustrated by Query1 is a "simple" or "inner" join. With an inner join, rows from the child table that do not satisfy the join condition are not reflected in the join result. In contrast, an outer join returns all child rows that satisfy the join condition and those rows from the child table for which no rows from the parent satisfy the join condition.

Computer database systems that are used for data warehousing frequently maintain materialized views that contain pre-computed summary information in order to speed up query processing. Such summary information is created by applying an aggregate function, such as SUM, COUNT, or AVERAGE, to values contained in the base tables. Materialized views that contain pre-computed summary information are referred to herein as "summary tables" or more simply, "summaries".

Summary tables typically store aggregated information, such as "sum of PRODUCT_SALES, by region, by month." Other examples of aggregated information include counts of tally totals, minimum values, maximum values, and average calculations. Summary tables are used to reduce the overhead associated with processing queries that request summary information. Because the summary information is already pre-computed, it need not be re-computed during the execution of each query that requests summary information. Instead, the pre-computed summary values can be directly retrieved from the summary columns of the summary table.

When a database user knows that a particular materialized view contains the data desired by the user, the user can formulate a query that extracts the desired data directly from that materialized view. However, there are numerous circumstances in which a user will design a query that does not reference a materialized view to retrieve a set of data that can be most efficiently retrieved by accessing the materialized view. For example, the user may not be aware of all of the materialized views available in the database, or may not be sure how a particular materialized view could be used to retrieve the desired information.

Even when the user is aware that materialized views are available that have data desired by the user, the user may prefer to have the server transparently rewrite the query in terms of the materialized views, rather than writing the query to directly reference the materialized views. By allowing the server to rewrite the query, the database administrator may easily add and drop materialized views without affecting the application code that imbeds the user query. For example, if a user query is rewritten by the server to use a particular materialized view MV1, then the application will not break if the database administrator decides to drop MV1. In contrast, if the user query directly references MV1 in the application code, then dropping MV1 will break the application.

In light of the foregoing, some database servers include mechanisms for rewriting queries that do not reference materialized views in a way that causes them to reference materialized views. The execution of the rewritten query is often considerably improved relative to the original query because the relational objects accessed by the rewritten query are (e.g. the materialized views) much smaller than the objects referenced in the original query (e.g. the base tables), and/or the number of objects used by the rewritten query is less than the number of objects referenced in the original query.

For example, a summary can correspond to a query which joins two tables and performs data aggregation to compute sum-of-sales by city, and stores the materialized result in a table. If a user issues a query Q which requests sum-of-sales by city, then Q can be transparently rewritten to access pre-computed data stored in the summary table. Because of the rewrite, the result for Q can be quickly produced by simply scanning the summary table instead of joining two tables and then aggregating the data.

Currently, database systems that include query rewrite mechanisms perform a series of tests on an incoming query to determine whether the query can be rewritten to access a particular materialized view. The tests include tests for (1) join compatibility and (2) data sufficiency. For summary tables, the tests additionally include tests for (3) grouping compatibility and (4) aggregate computability.

With respect to join compatibility, the test is passed if all joins in a materialized view match exactly with joins in a query, with possibly zero or more additional joins in the query. For example, if a materialized view joins tables A and B, and the query requires a join of A, B and C, then the join compatibility test is passed. However, if the materialized view joins tables A, B and D, and the query requires a join of A, B and C, then the join compatibility test fails.

With respect to data sufficiency, the test is passed if all necessary columns of a query can be obtained using the data stored in the materialized view. If values from a column necessary for the processing of a query are not contained in the materialized view, then the data sufficiency test fails.

With respect to grouping compatibility, the test is passed if the aggregates in a summary are at the same or lower level than the level of aggregates in a query. For example, a sum of sales by month is at a lower level than a sum of sales by year. Therefore, the grouping compatibility is passed if the summary has sum of sales by month and the query asks for sum of sales by year, but is failed if the summary has sum of sales by year and the query asks for sum of sales by month.

With respect to aggregate computability, the test is passed if each aggregate required by the query is computable from one or more aggregates in the summary. For example, the aggregate computability test is passed if the summary contains sum and count values, and the query requires an average. The aggregate computability test fails if the summary only contains sum, and the query requires an average.

If all of these tests are passed, then the rewrite mechanism determines that the received query can be rewritten to reference the materialized view in question.

Unfortunately, as these tests are currently applied, database servers often conclude that materialized views cannot be used to process a query when in fact they could be. In fact, database servers may conclude that a query cannot be rewritten to access a materialized view when use of the materialized view would actually be the most efficient way to process the query.

Based on the foregoing, it is clearly desirable to provide a query rewrite mechanism that is capable of rewriting queries to access materialized views that would otherwise have been considered ineligible by conventional rewrite mechanisms.

SUMMARY OF THE INVENTION

A method and system is provided for processing queries. According to one aspect of the invention, techniques are provided for handling a query that does not reference a particular materialized view, where the query requires access to values from a particular column not contained in the materialized view. Under these conditions, it is determined whether the particular materialized view satisfies each condition in a set of conditions, the set of conditions at least including a condition that the particular column is functionally dependent on a column that does belong to the materialized view; and if the materialized view satisfies each condition in the set of conditions, then the query is rewritten to produce a rewritten query that references the materialized view and joins the materialized view back to a join-back table that contains the particular column.

According to another aspect of the invention, a technique is provided for processing a query that does not reference a particular materialized aggregate view, where the materialized aggregate view specifies an outer join between a child table and a parent table and the query specifies a particular type of join between the child table and the parent table, where the particular type of join is one of an inner join, an anti-join and a semi-join. The query is rewritten to produce a rewritten query that accesses the materialized aggregate view to produce data required by the query.

According to yet another aspect of the invention, a technique is provided for processing a query that does not reference a particular materialized view and that specifies that results are to be grouped by a first set of one or more columns, where the materialized view reflects data that is grouped by a second set of one or more columns. Under these conditions, it is determined whether each column in the first set of columns either a) exactly matches a column in the second set of columns, b) is functionally dependent on another column in the first set of columns, or c) is functionally dependent on a column in the second set of columns.

If each column in the first set of columns either exactly matches a column in the second set of columns, is functionally dependent on another column in the first set of columns, or is functionally dependent on a column in the second set of columns, then the query is rewritten to produce a rewritten query that references the materialized view.

By using the techniques described herein, more queries can take advantage of the set of materialized views that exist in the database, thus resulting in improved query execution speeds. Conversely, the number of materialized views that a database must contain in order to efficiently process a particular set of queries is reduced, thus reducing the size of the database and eliminating the overhead associated with maintaining the materialized views that are no longer necessary.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8A is a block diagram of an exemplary fact table;

FIG. 8B is a block diagram of an exemplary de-normalized dimension table;

FIG. 8C is a block diagram of exemplary dimension tables in a normalized schema; and FIGS. 9A, 9B and 9C are block diagrams of tables used to illustrate scaling factors according to an embodiment of the invention.

DETAILED DESCRIPTION OF THE PREFERRED EMBODIMENT

A method and apparatus for rewriting queries to take advantage of existing materialized views is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
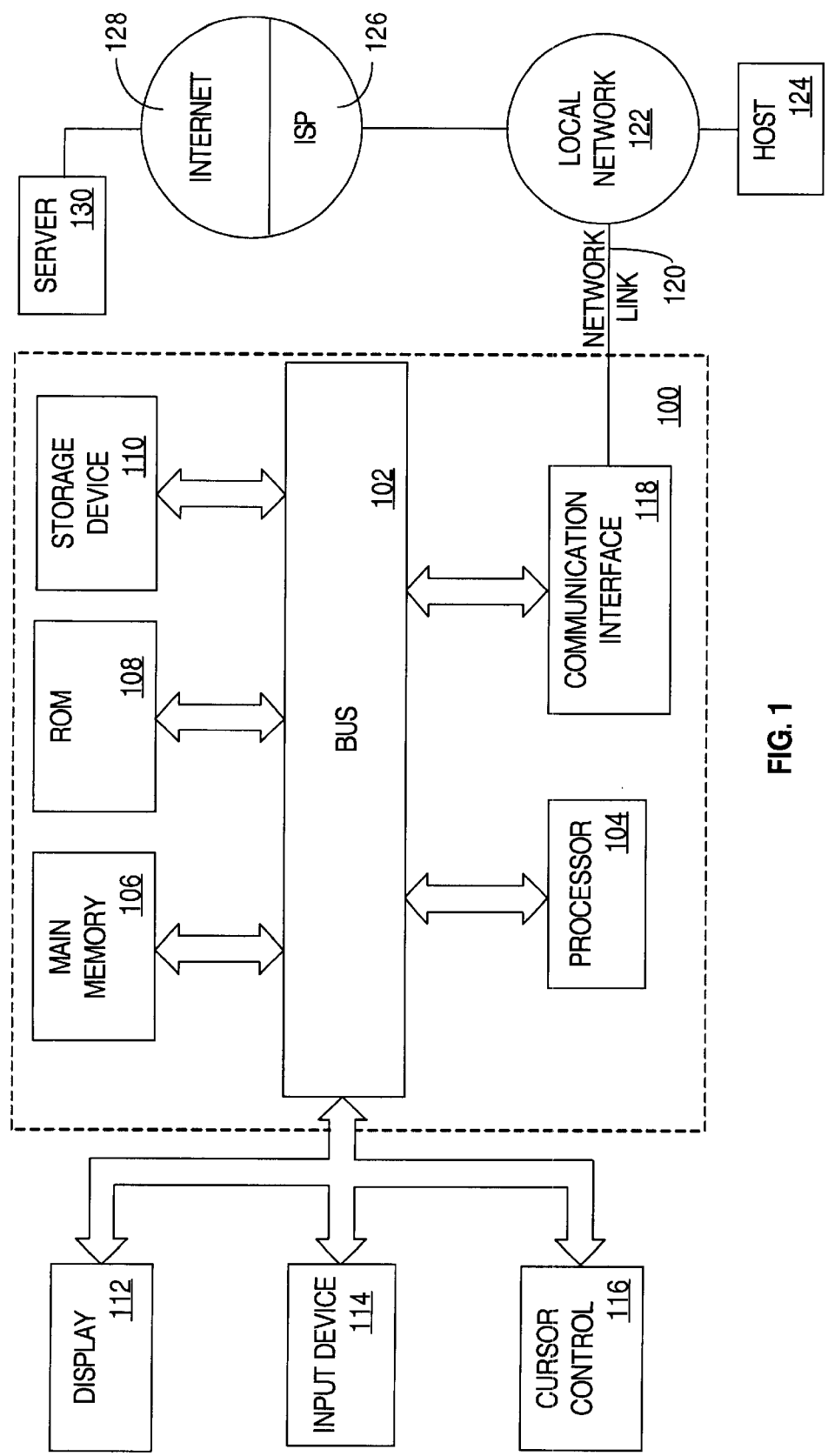
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for rewriting queries to take advantage of existing materialized views. According to one embodiment of the invention, queries are rewritten by computer system 100 to take advantage of existing materialized views in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Terms and Notation

For the purpose of explanation, the following terms and conventions are used herein to describe embodiments of the invention:

The notation "><" is used herein as an inner join operator. Thus, T1><T2 indicates an inner join between tables T1 and T2.

The notation "->" is used herein as an outer join operator. Thus, T1->T2 indicates an outer join between tables T1 and T2, where table T1 is the outer table.

In the joins T1><T2 and T1->T2, T1 is referred to as the "left" or "child" table and T2 is referred to as the "right" or "parent" table.

A complex join involves numerous joins. For example, the complex join T1><T2><T3->T4 requires an inner join between T1 and T2 to produce a first set of rows, an inner join between the first set of rows and T3 to produce a second set of rows, and an outer join between the second set of rows and T4 to produce a third set of rows. The third set of rows constitute the result set of the complex join.

Joins are performed by combining two tables. In this context, the term "table" refers to any source of rows, including the product of join operations between one or more other tables. For example, the complex join illustrated above can be expressed as an outer join between a table RS1 and table T4, where table RS1 is equal to the result of (T1><T2><T3). In this case, RS1 is the child table of the join, and T4 is the parent table of the join. Similarly, the join T1><T2><T3 can be expressed as an inner join between a table RS2 and table T3, where RS2 is equal to the result of (T1><T2).

Figure 5A:
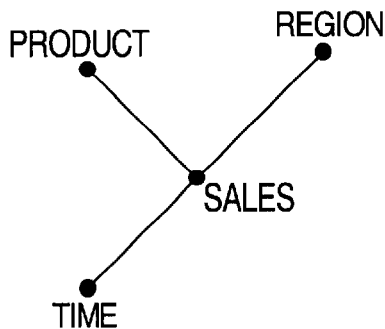
FIG. 5A is a diagram that illustrates a join graph.

Joins can be illustrated using join graphs. In a join graph, vertices represent base tables and edges represent joins between the base tables. For example, FIG. 5A is join graph illustrating the joins contained in the query:

Select product_name, city, month, sum(dollarsales)
from Sales, Product, Region, Time
where
Sales.prod_key=Product.prod_key
Sales.region_key=Region.region_key
Sales.time_key=Time.time_key
Group by product_name, city, month Comparing a join graph of a materialized view with the join graph of a query produces a combined join graph that includes (1) a set of joins that are common to both the materialized view and the query, (2) a set of joins that are in the query but not the materialized view, and (3) a set of joins that are in the materialized view but not in the query.

The set of joins that are common to both the materialized view and the query are referred to as "common section".

The set of joins that are in the query but not the materialized view are referred to as the "query delta".

The set of joins that are in the materialized view but not in the query are referred to as the "materialized view delta".

For example, assume that a query contains the join A><B><C->D and a materialized view definition contains the join A><B><E. Under these conditions, the join A><B is the common section, the joins B><C and C->D belong to the query delta, and the join B><E belongs to the materialized view delta.

A join in a materialized view definition is said to be "non-matching" relative to a query if the join belongs to the materialized view delta. For example, if a query contains the join A><B><C->D and a materialized view definition contains the join A><B><E, then the join B><E is a non-matching join relative to the query.

A join is referred to as a "lossless" join when all rows in the child table are reflected in the join result. All outer joins are lossless joins by definition because all rows in the outer table of an outer join are always reflected in the result of the outer join.

A materialized view can be thought of as a join between the common section and the materialized view delta. The join between the common section and the materialized view delta is "lossless" relative to the common section if each row that exists in the common section is reflected in at least one row of the materialized view.

A join is referred to as a "one-to-one" join when each row in the child table is reflected in no more than one row of the join result. One way to ensure that a join will be one-to-one is to impose a uniqueness constraint on the join column of the parent table. If all values in the join column of the parent table are unique, then no more than one row in the parent table will have a value in its join column that matches any given value in the join column of the child table.

A join is referred to as a "one-to-N" join when no constraints prevent rows in the child table from combining with more than one row in the parent table.

A join is "one-to-one lossless" relative to the child table if each row in the child table is reproduced exactly once in the result of the join. If the join is an inner join, then the join between the child table and the parent table is one-to-one lossless if each row in the child table combines with exactly one row of the parent table. This does not prevent more than one row of the child table from joining with the same row in the parent table.

Stated another way, a join is one-to-one lossless if either:

(1) the join is an inner equijoin, and (2) the parent side join key is unique, and (3) the child side join key has no nulls, and (4) there is no child side join key value that is not also a parent side join key value (this condition will be satisfied if, for example, a referential integrity relationship exists between the child side join key and the parent side join key);

or (1) the join is a left outer join, and (2) the parent side join key is unique.

A join is a "one-to-N lossless join" when each row of the child table is reflected in at least one row produced by the join. All conditions shown above for one-to-one lossless joins must be satisfied for a join to be a one-to-N lossless join, with the exception that the parent side join key does not have to be unique.

Query Processing Overview

Figure 2A:
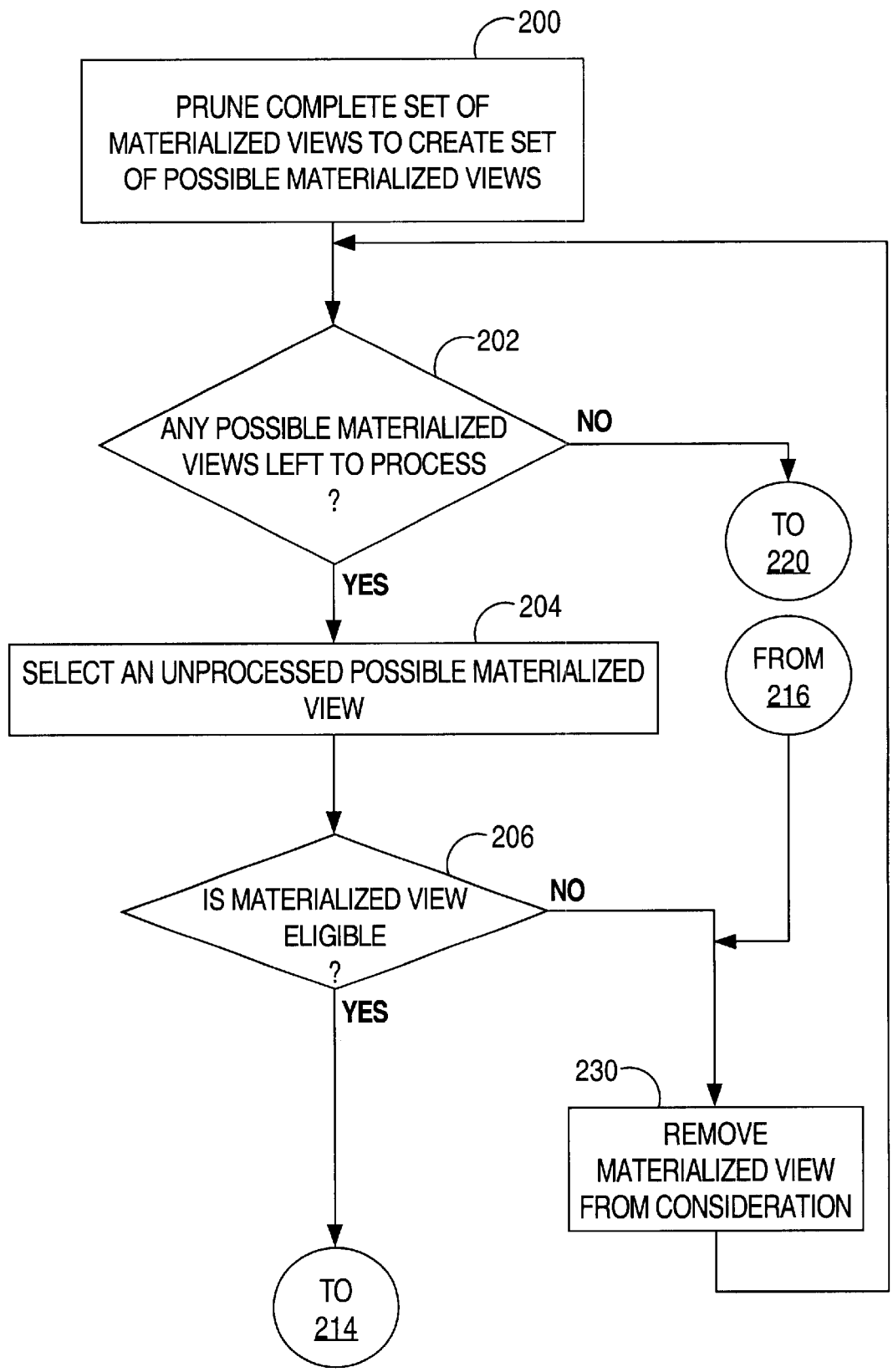
FIGS. 2A, 2B and 2C are parts of a flow chart that illustrates steps for selecting a query execution plan according to an embodiment of the invention.
Figure 2B:
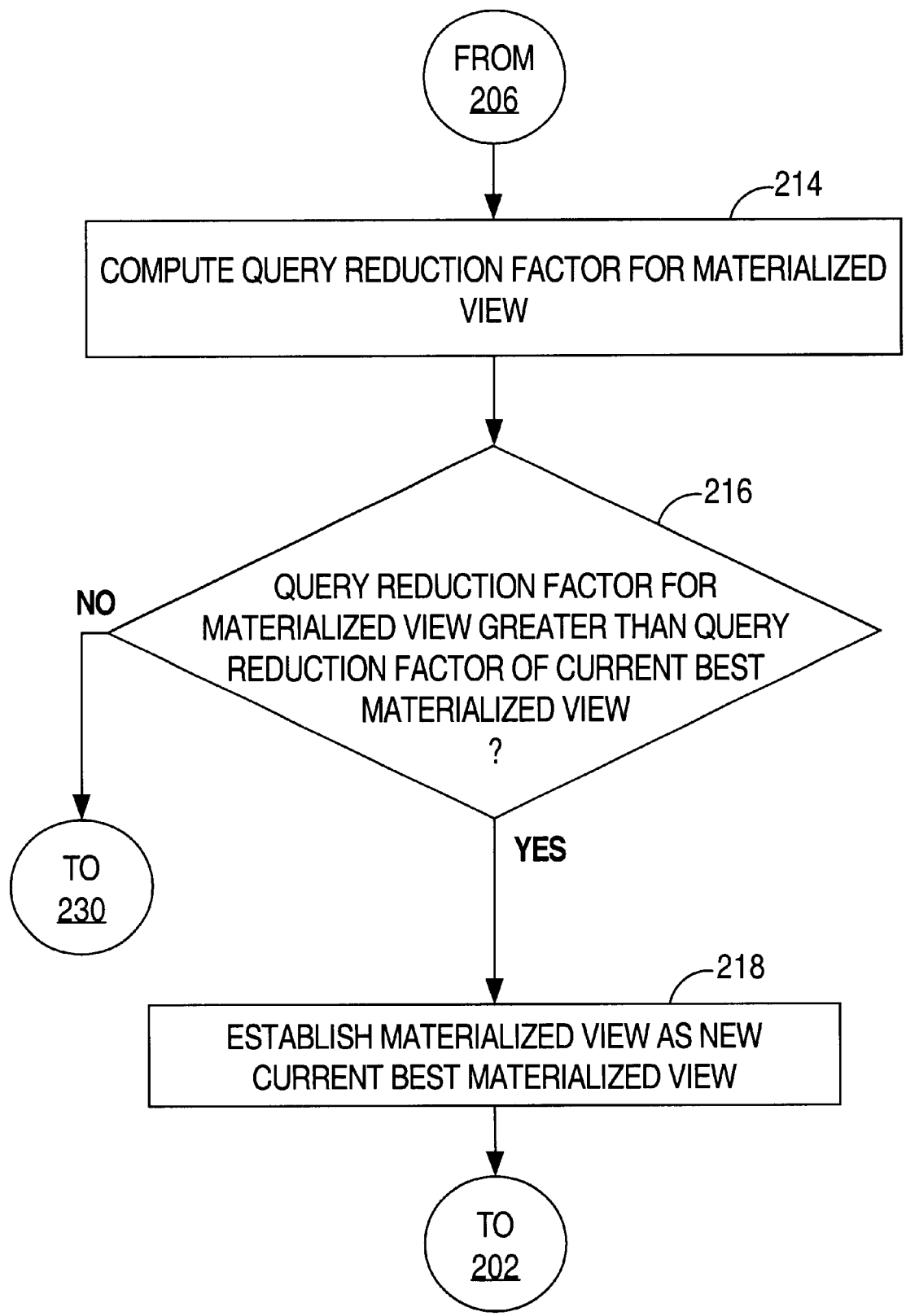
Figure 2C:
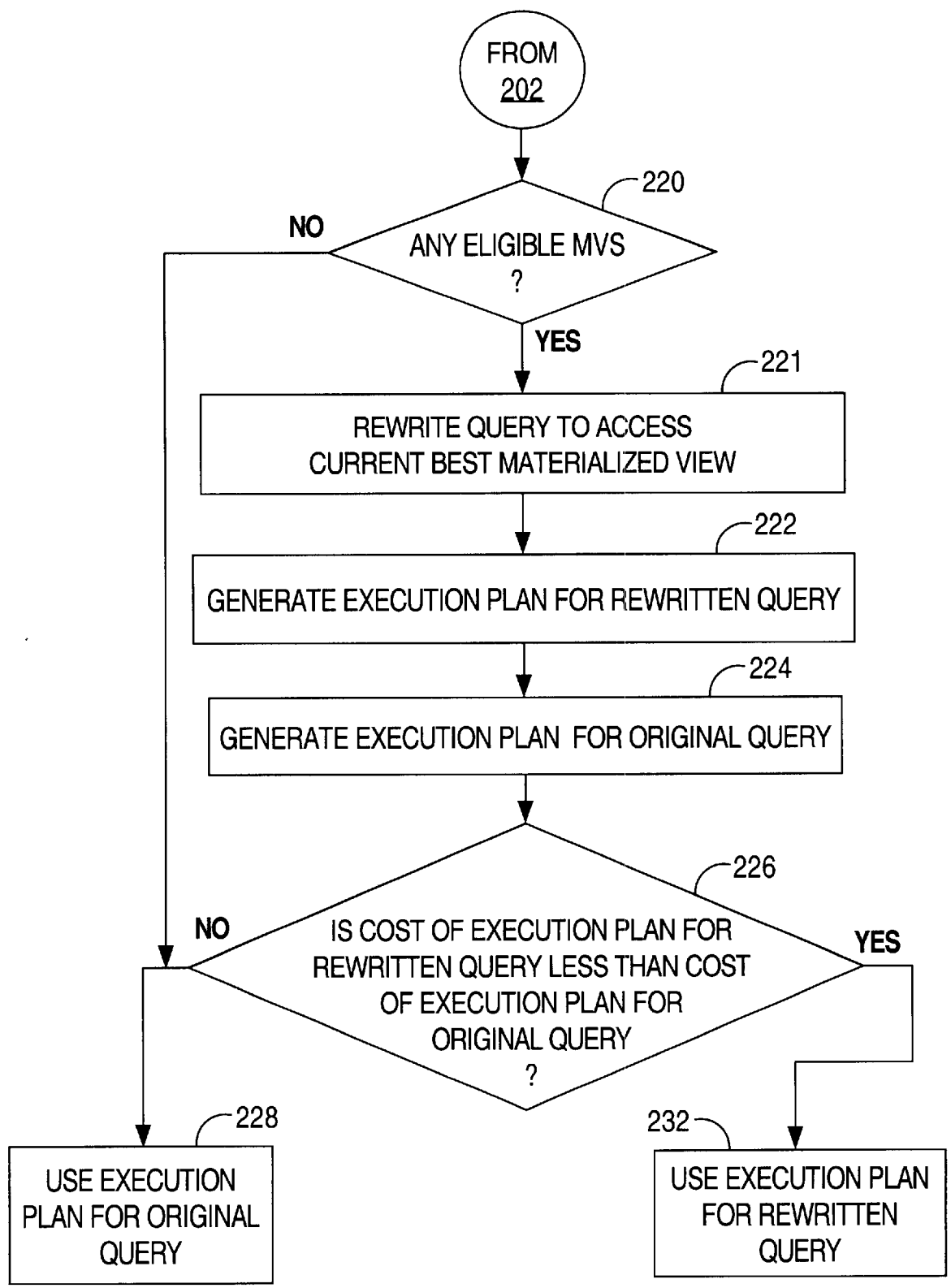

According to an embodiment of the invention, when accessing a materialized view will reduce the execution cost of a query, an execution plan that accesses the materialized view is used to execute the query, even though the original query does not make reference to the materialized view. FIGS. 2A, 2B and 2C contain a flowchart that illustrates the steps performed by a database server in response to receiving a query, according to an embodiment of the invention.

The database managed by the database server includes one or more materialized views. The set of all of the materialized views included in the database is referred to herein as the "complete set of materialized views". At step 200, the complete set of materialized views is "pruned" to create a set of possible materialized views. The set of possible materialized views includes those materialized views that could possibly be used to process a received query.

Various criteria may be used during this pruning process. For example, one possible pruning criteria may be that at least one of the tables referenced in the received query must be a base table of the materialized view. Based on this criteria, a materialized view that has base tables A, B, and C would qualify as a "possible materialized view" with respect to a query that requires a join between tables A and D. On the other hand, a materialized view that has base tables B, C and E would not qualify as a "possible materialized view" with respect to a query that requires a join between tables A and D.

Steps 202 and 204 form a loop in which each materialized view in the set of possible materialized views is processed. During the processing of each materialized view, the database server determines whether the materialized view is actually eligible to be used in a rewrite of the received query, and if so, the relative benefit gained by using that particular materialized view. Specifically, at step 202, it is determined whether any "possible materialized views" are left to be processed. If all possible materialized views have been processed, control passes to step 220. Otherwise, control passes to step 204.

At step 204, an unprocessed possible materialized view is selected. At step 206, it is determined whether the selected materialized view is eligible for use in rewriting the received query. If the selected materialized view is not found to be eligible, control passes to step 230, and the materialized view is removed from consideration. From step 230, control passes back to step 202.

If the selected materialized view is found to be eligible at step 206, control passes to step 214. At step 214, a "query reduction factor" is computed for the materialized view currently being processed. The query reduction factor is a value that estimates how useful it will be to access the materialized view to process the received query. The higher the query reduction factor, the greater the estimated benefit of using the materialized view to process the query.

According to one embodiment of the invention, the query reduction factor for a materialized view is the ratio of (1) the sum of the cardinalities of matching relations in the query that will be replaced by the materialized view to (2) the cardinality of the materialized view. When use of the materialized view requires a join back, then the query reduction factor is adjusted to take into account the overhead associated with the join back. This is simply one example of how the query reduction factor may be determined. The present invention is not limited to any particular query reduction factor calculation.

At step 216, the query reduction factor for the materialized view being processed is compared to the highest previously calculated query reduction factor (the query reduction factor of the "current best materialized view"). If the query reduction factor for the materialized view being processed is greater than the highest previously calculated query reduction factor, then the materialized view being processed becomes the new "current best materialized view" (step 218) and control passes back to step 202. Otherwise, the materialized view being processed is removed from consideration (step 230) and control passes back to step 202.

After all possible materialized views have been processed, the current best materialized view will be the materialized view that has the highest query reduction factor of all materialized views that passed the eligibility tests. If at least one materialized view passed the eligibility tests, control passes from step 220 to step 221. Otherwise, control passes to step 228 and the execution plan associated with the original query is used to execute the query.

At step 221, the received query is rewritten to access the current best materialized view. The specific steps involved in rewriting a query to access a materialized view shall be described in greater detail below.

At step 222, an execution plan is generated for the rewritten query. At step 224, an execution plan is generated for the original query. At step 226, it is determined whether the estimated cost of executing the execution plan associated with the rewritten query is less than the estimated cost of executing the execution plan associated with the original query. If the estimated cost of executing the execution plan associated with the rewritten query is less than the estimated cost of executing the execution plan associated with the original query, then the execution plan associated with the rewritten query is used to execute the received query (step 232). Otherwise, the execution plan associated with the original query is used to execute the received query (step 228).

Materialized View Eligibility

Figure 2D:
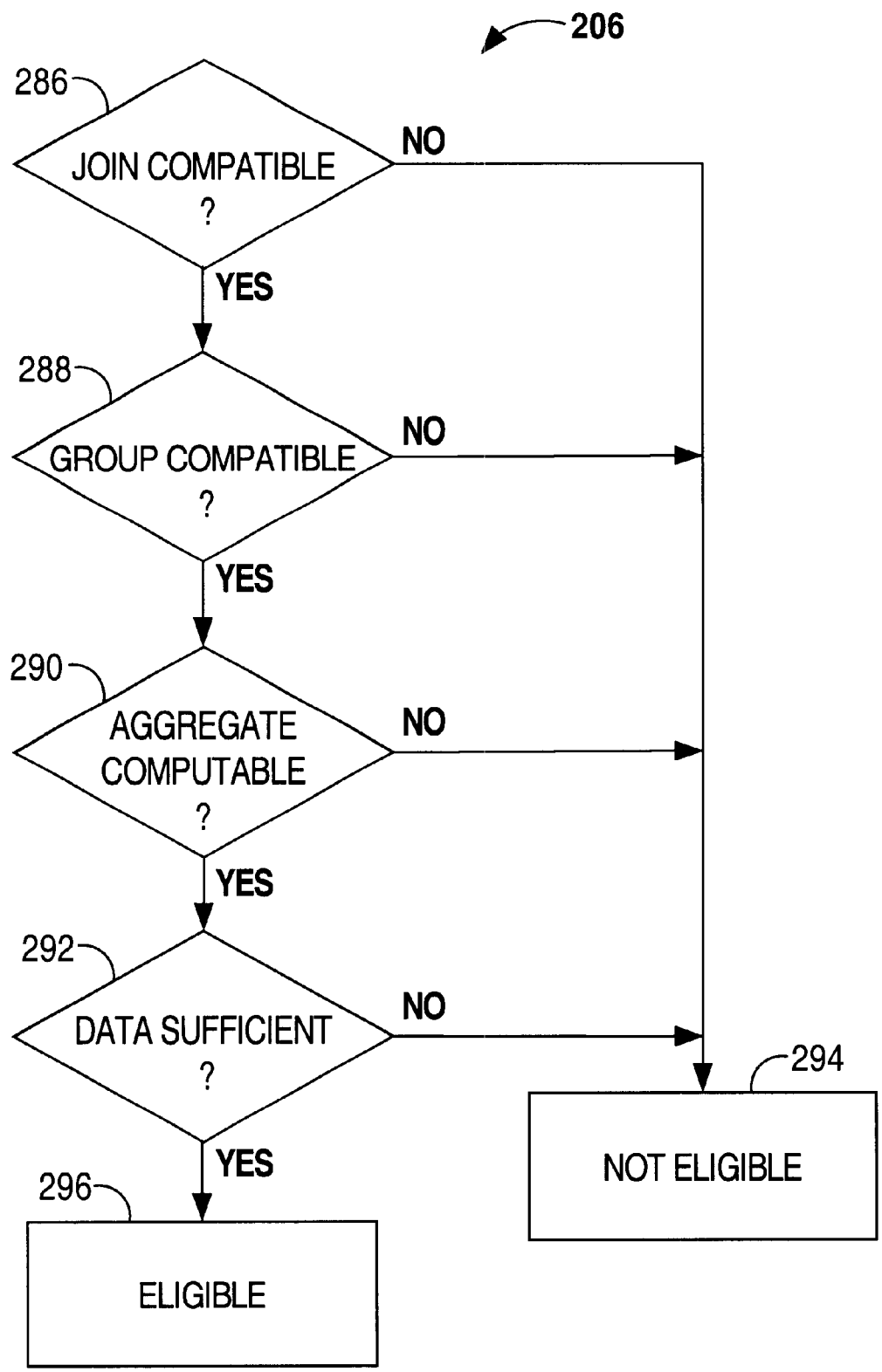
FIG. 2D is a flow chart that illustrates steps for determining whether a particular materialized view is eligible to be used to rewrite a particular query.

As mentioned above, the query rewrite process includes a phase (step 206) during which it is determined whether a particular materialized view is eligible to be used in the rewrite of a particular query. FIG. 2D is a flowchart that illustrates the tests performed during this phase of the rewrite process when the materialized view at issue is a summary table.

Referring to FIG. 2D, during steps 286, 288, 290 and 292, a series of tests are performed to determine whether a selected summary table is eligible to be used in a rewrite of a received query. The tests include tests for join compatibility (step 286), grouping compatibility (step 288), aggregate computability (step 290), and data sufficiency (step 292).

When the materialized view is not a summary table, the grouping compatibility and aggregate computability steps are not applicable and therefore are skipped.

As shall be described in greater detail hereafter, embodiments of the invention implement these tests differently than conventional database servers. As a result, summary tables that would otherwise have been excluded from consideration by conventional database servers may pass these tests in database servers that implement the present invention.

Join Compatibility

One of the eligibility tests performed by a database server to determine whether a materialized view can be used to process a received query is referred to as the join compatibility test. Conventionally, this test is performed by determining whether all joins in a materialized view match exactly with joins in a query, with possibly zero or more additional joins in the query. In other words, the join compatibility test is passed if and only if the join graph of the materialized view is a subset of the join graph of the received query. For example, if a materialized view joins tables A and B, and the query requires a join of A, B and C, then the join compatibility test is passed. However, if the materialized view joins tables A, B and D, and the query requires a join of A, B and C, then the join compatibility test fails.

According to one aspect of the present invention, a query rewrite mechanism is provided that performs a different join compatibility test than that performed by conventional query rewrite mechanisms. Specifically, consider the following four scenarios:

(1) A materialized view MV contains a join between tables A and B. A query Q contains the same join as in MV, between tables A and B. Materialized view MV passes the conventional join compatibility test.

(2) A materialized view MV contains a join between tables A and B. A query Q contains the same join as in MV between tables A and B, and another join between tables A and C. Materialized view MV passes the conventional join compatibility test.

(3) A materialized view MV contains a join between tables A and B, and another join between tables A and C. A query Q contains the same join as in MV between tables A and B. Materialized view MV fails the conventional join compatibility test.

(4) A materialized view MV contains a join between tables A and B, and another join between tables A and C. A query Q contains the same join as in MV between tables A and B, and another join between tables A and D. Materialized view MV fails the conventional join compatibility test.

In the third and fourth scenario, the materialized view MV fails the conventional join compatibility test because the materialized view MV contains a join that is not in the query (a "non-matching join"). According to one aspect of the invention, the join compatibility test is expanded so that the existence of a non-matching join in the materialized view does not automatically constitute failure of the join compatibility test.

Specifically, when a materialized view contains one or more non-matching joins, the query rewrite mechanism makes a further determination of whether the join between the common section and the materialized view delta is lossless. If the join between the common section and the materialized view delta is lossless, then the materialized view passes the join compatibility test even though it contains non-matching joins. If the join between the common section and the materialized view delta is not lossless, then the join compatibility test fails.

One technique to determine whether the join between the common section and the materialized view delta is lossless is to check whether each of the non-matching joins is lossless. If each of the non-matching joins contained in materialized view definition is lossless, then the materialized view passes the join compatibility test in spite of the fact that the materialized view contains non-matching joins.

Figure 3:
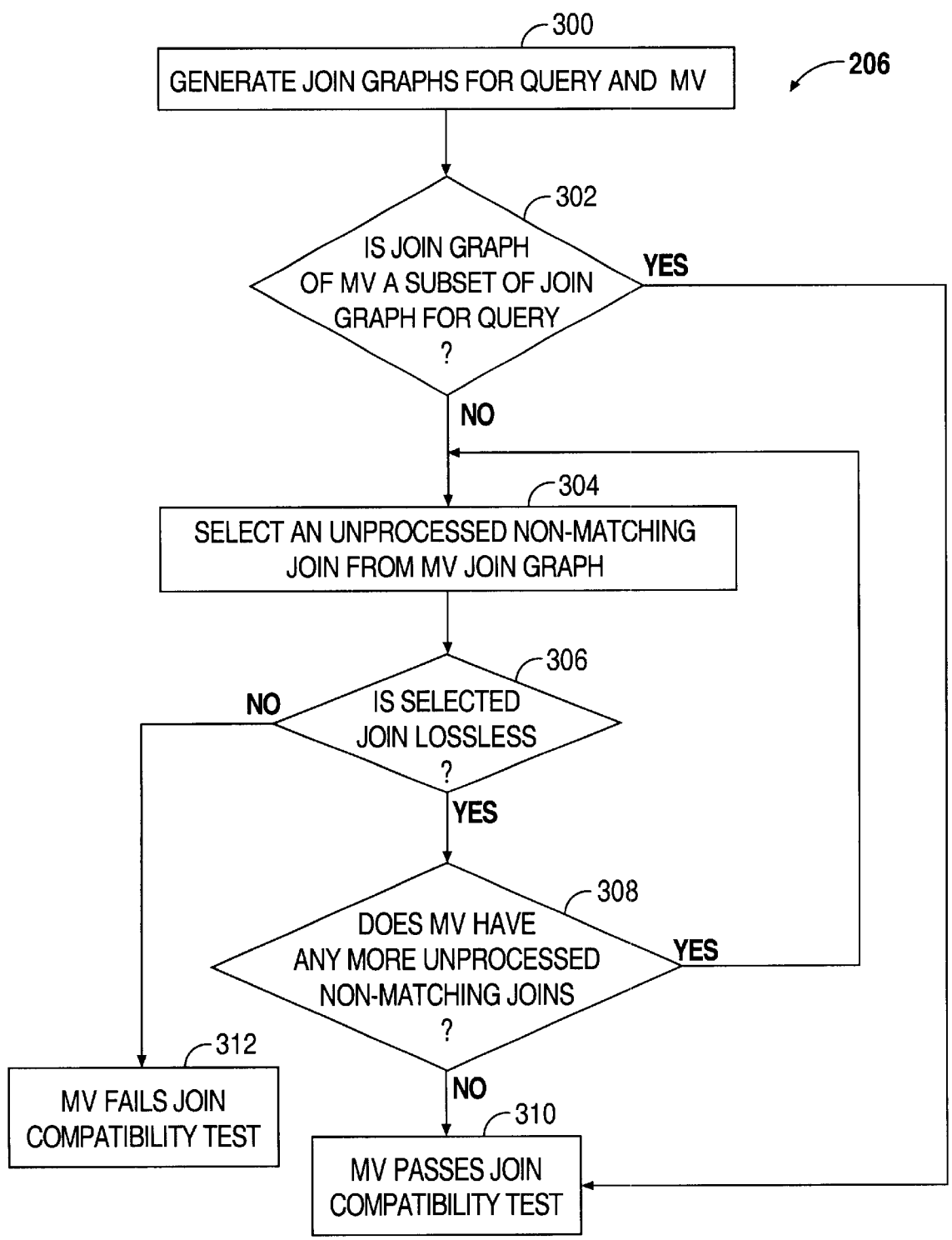
FIG. 3 is a flow chart that illustrates steps for determining whether a materialized view is join compatible with a query according to an embodiment of the invention.

FIG. 3 is a flow chart that illustrates the steps involved in determining whether a materialized view is join compatible to a query (step 206) according to an embodiment of the invention. At step 300, a join graph is generated for the query and a join graph is generated for the materialized view. In a join graph, vertices represent base tables and edges represent joins between the base tables. For example, assume that a materialized view MV is defined by the following query:

QUERY2

Select product_name, city, month, sum(dollarsales) as sumsales
from Sales, Product, Region, Time
where
Sales.prod_key Product.prod_key
Sales.region_key=Region.region_key
Sales.time_key=Time.time_key
Group by product_name, city, month The join graph for that materialized view would have the join graph illustrated in FIG. 5A. Assume that a database server wishes to know whether that materialized view is join compatible with a received query:

QUERY3

Figure 5B:
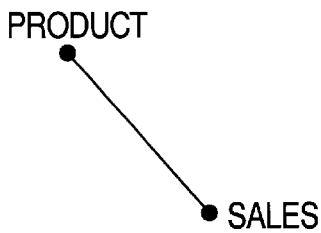
FIG. 5B is a diagram that illustrates a join graph.

Select product_name, sum(dollarsales)
from Sales, Product
where
Sales.prod_key=Product.prod_key
Group by product_name The join graph for query is illustrated in FIG. 5B. After the join graphs have been generated for both the materialized view and the received query, control passes to step 302. At step 302, it is determined whether the join graph of the materialized view is a subset of the join graph for the received query. If the join graph of the materialized view is a subset of the join graph for the received query, then control passes to step 310 and the materialized view passes the join compatibility test.

If the join graph of the materialized view is not a subset of the join graph for the received query, then the join graph for the materialized view contains at least one non-matching join relative to the query, and control passes to step 304. In the example given above, the materialized view based on query2 contains two joins that are non-matching relative to query: a join between Sales and Region, and a join between Sales and Time.

Steps 304 and 308 form a loop during which step 306 is performed for each non-matching join of the materialized view. At step 306, it is determined whether a non-matching join in the materialized view is lossless. If any of the non-matching joins in the materialized view are not lossless, then control passes to step 312 and the materialized view fails the join compatibility test. If all of the non-matching joins in the materialized view are lossless, then control passes to step 3 10 and the materialized view passes the join compatibility test.

Graph Traversal

Using the join compatibility test described above, every non-matching join in the materialized view is tested for losslessness. However, if one or more of the non-matching joins are outer joins, then the join between the common section and the materialized view delta may still be lossless even though some of the non-matching joins are not lossless.

For example, assume that a defining query for a materialized view includes the join: A><B->C><D. Further assume that the query in question specifies the join A><B. In this case, the joins B->C and C><D are non-matching joins. B->C is lossless by definition, since B->C is an outer join. The join C><D is an inner join and therefore may not be lossless. However, under these conditions, the join between the common section A><B and the materialized view delta C><D is lossless even if the non-matching C><D is not lossless. This is because all of the rows of A><B will be preserved even if they do not match any rows of C><D, since the join between A><B and C><D is an outer join.

Figure 6A:
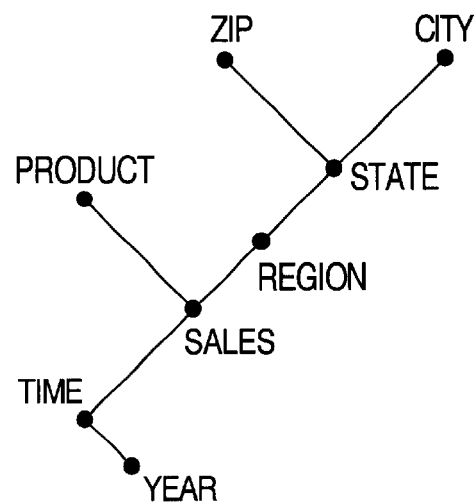
FIG. 6A is a diagram that illustrates a join graph associated with a materialized view.
Figure 6B:
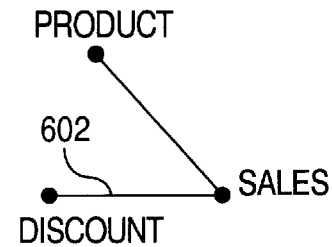
FIG. 6B is a diagram that illustrates a join graph associated with a query.

Referring to FIG. 6A, it illustrates the join tree of a relatively complex materialized view. FIG. 6B illustrates the join tree of a query. The query contains one join 602 that is not in the materialized view. The materialized view, on the other hand, contains six non-matching joins, illustrated in FIG. 6C as joins 604, 606, 608, 610, 612 and 614.

In step 304 of the join compatibility test illustrated in FIG. 3, an unprocessed non-matching join is selected. According to one embodiment, this selection is not made randomly. Rather, the join graph of the materialized view is traversed, processing each join as it is reached during the traversal process.

Figure 6C:
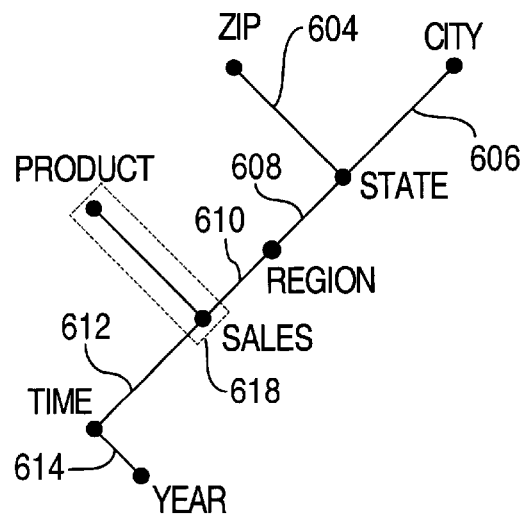
FIG. 6C is the join graph of FIG. 6A, where the common section between the join graph of FIG. 6A and the join graph of FIG. 6B is highlighted.

In the example illustrated in FIG. 6C, the portion of the join graph that matches the query is identified to as common section 618. Each join that is connected to the common section 618 is a root of a subtree within the join graph. In the illustrated example, joins 610 and 612 are connected to common section 618. Join 610 is the root of a subtree that includes joins 610, 608, 606 and 604. Join 612 is the root of a subtree that includes joins 612 and 614.

According to one embodiment, each subtree is traversed. However, during the traversal not every join is necessarily visited. Specifically, the traversal down a particular branch of a subtree is terminated if (1) the branch is not connected to any other unvisited branches, (2) a join that is not lossless is encountered, or (3) an outer join is encountered. In the case that a join that is not lossless is encountered, the traversal ends because the materialized view fails the join compatibility test. In the case that an outer join is encountered, the traversal of the branch ends because the joins further down the branch will not have any effect on whether the materialized view is lossless relative to the join contained in the query.

For example, the traversal of the materialized view may proceed as follows:

(1) join 610 is determined to be a lossless inner join (2) join 608 is determined to be an outer join (traversal of the current branch is terminated)

(3) join 612 is determined to be a lossless inner join (4) join 614 is determined to be a lossless inner join At this point, all of the subtrees that stem from common section 618 have been processed. During the traversal, joins 604 and 606 were never processed because join 608 is an outer join. Consequently, it was not determined whether joins 604 and 606 are lossless. However, since join 608 is an outer join, whether joins 604 and 606 are lossless has no effect on whether the join between the common section and the materialized view delta is lossless.

Test for Losslessness

As mentioned above, a join is lossless if all rows in the child table are reflected in the join result. Consequently, one way to determine whether a non-matching join of a materialized view is lossless would be to execute a query to verify that every row of the child table of the join is reflected in the materialized view. Unfortunately, execution of such a query would typically involve too much overhead. In addition, such a query would only indicate whether the join is currently lossless, not whether the join will always be lossless.

Figure 4:
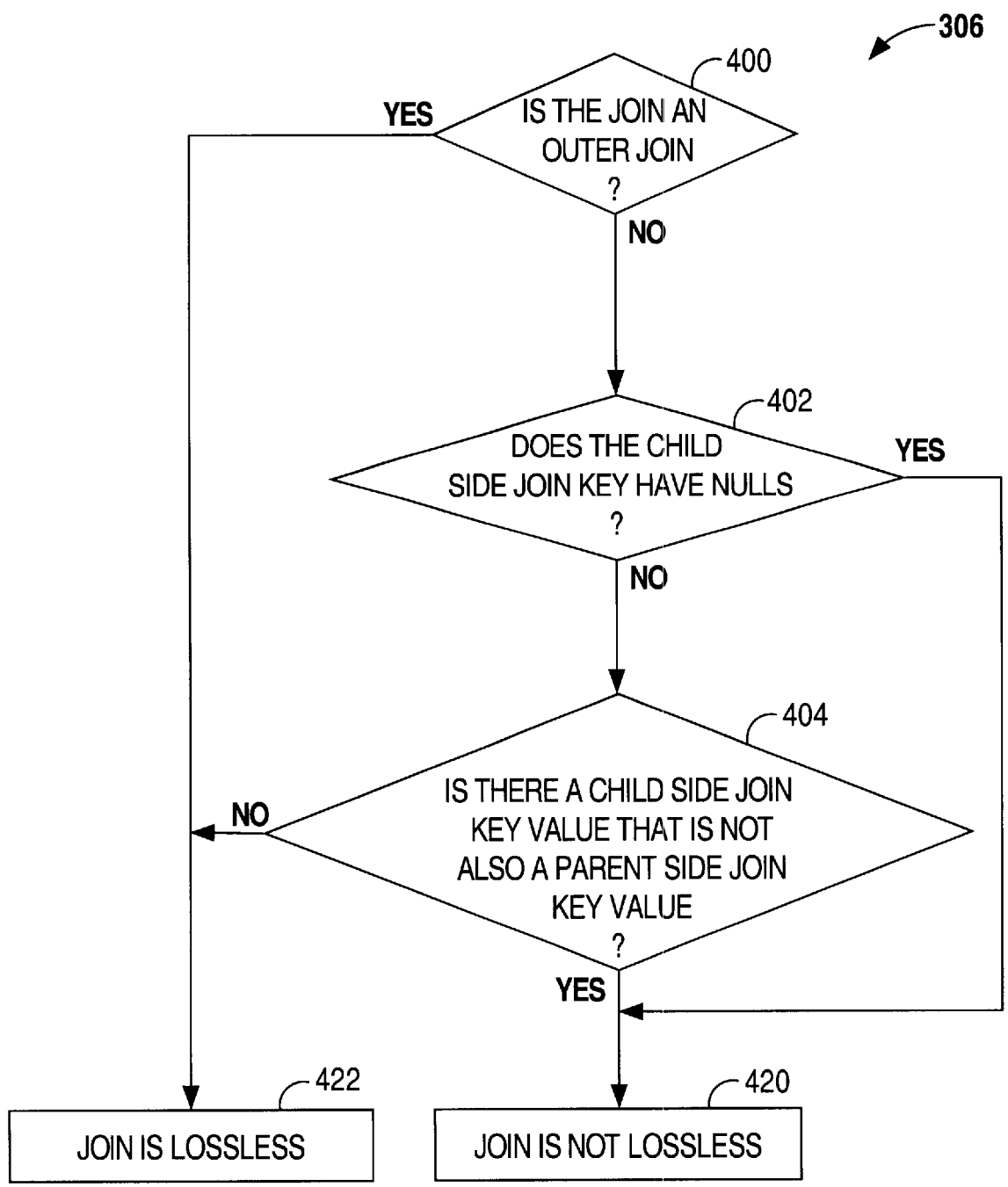
FIG. 4 is a flow chart illustrating steps for determining whether a join is lossless.

According to one aspect of the invention, the determination of whether a join is lossless is made based on metadata associated with the tables involved in the join. The steps used to determine whether a particular join is lossless are illustrated in FIG. 4. Referring to FIG. 4, at step 400 it is determined whether the join is an outer join. If the join is an outer join, the join is (by definition) lossless, and control passes to step 422.

If the join in not an outer join, then control passes to step 402. At step 402, it is determined whether the child side join key has any nulls. While this determination can be made by scanning the values in the child side join key, it is preferably performed by determining whether a non-null constraint has been placed on the one or more columns that constitute the child side join key. If the child side join key has nulls, then the join is not lossless and control passes to step 420.

If the child side join key does not have nulls, control passes to step 404 and it is determined whether any child side join key value is not also a parent side join key value. This step may be performed by determining whether there is a referential constraint on the child and parent side join keys that prevents the insertion of values that are not in the parent side join key and that ensures uniqueness of the parent-side join key. If any child side join key value is not also a parent side join key value, then control passes to step 420 where it is determined that the join is not lossless. If all child side join key values are also parent side join key values, then control passes to step 422 and it is determined that the join is lossless.

Lossless One-To-One

If all of the non-matching joins in a materialized view are lossless, or if all those that are not lossless are preceded in a join graph subtree by an outer join, then the materialized view passes the join compatibility test because the materialized view contains at least one copy of all rows in the common section. However, additional benefits may be gained if all non-matching joins are one-to-one.

If the materialized view contains duplicate rows from the common section, a query rewritten to access the materialized view typically has to be rewritten in a way that requires an additional step of removing duplicate common section rows from the materialized view. Such duplicate removal may be accomplished, for example, by performing a DISTINCT operation on a column in the materialized view that (1) exists in the common section and (2) is subject to uniqueness and non-null constraints. When the materialized view is a summary table, more complicated techniques for removing the effects of duplications may be necessary. Those techniques are described in detail hereafter.

However, if all non-matching joins of a materialized view are one-to-one as well as lossless, then the materialized view will contain exactly one copy of every row in the common section. Thus, the rewritten query need not require a DISTINCT operation.

For example, assume that a database contains the materialized view MV created by query2, and that query is received. Relative to query, MV contains the non-matching joins:

Sales.region_key=Region.region_key
Sales.time_key=Time.time_key

If the database server determines that these joins are one-to-one lossless, then query can be rewritten to access MV as illustrated by query4:

QUERY4

Select product_name, sum(sumsales)
from MV
Group by product_name

As a second example, assume that the database server desires to rewrite the following query to access the materialized view MV:

QUERY5

Select product_name, year, sum(dollarsales)
from Sales, Product, Time, Month
where
Sales.prod_key=Product.prod_key
Sales.time_key=Time.time_key
Time.month=Month.month
Group by product_name, year Query5 contains one join "Time.month=Month.month" that is not contained in the MV. On the other hand, the materialized view MV contains one non-matching join "Sales.region_key=Region.region_key" relative to query5. If the database server determines that this non-matching join is one-to-one lossless, the query can be rewritten:

QUERY6

Select product_name, year, sum(sumsales)
from MV, Month
where
Month.month=MV.month
Group by product_name, year Various techniques may be used to determine whether a lossless non-matching join is one-to-one lossless. According to one embodiment, a lossless join is determined to be one-to-one lossless if the parent side join key is subject to a uniqueness constraint. Thus, once the join:

Sales.region_key=Region.region_key has been determined to be lossless, the database server can determine whether Region.region_key is subject to a uniqueness constraint. If Region.region_key is subject to a uniqueness constraint, then the join is one-to-one lossless.

Summary Tables with One-To-Many Lossless Joins

If the join between the common section and the materialized view delta is one-to-many, then child-side rows of the one-to-many join may be duplicated in the join result. When the materialized view contains no aggregation (i.e. is not a summary table), then the effect of duplicate child-side rows can be eliminated through the use of a DISTINCT operation when the associated keys are exposed, or a surrogate such as the primary key or rowid, as described above. However, when the materialized view contains aggregation, then the aggregate values within the materialized view will have been computed based on all child-side rows that are reflected in the join result, including child-side rows that are duplicated multiple times in the join result. Consequently, a query that is rewritten to access a summary table that has a non-matching one-to-many lossless join must be rewritten in such a way as to counteract the effect of child-side rows that are reflected multiple times in the aggregate values.

Certain types of aggregate functions, such as MIN and MAX, are absolute in that they will produce the same result regardless of whether the set of values to which they are applied contains duplicates. However, other types of aggregate functions, such as COUNT and SUM, are cumulative and will therefore be affected by the existence of duplicate values in the set of values to which they are applied. The techniques described hereafter illustrate how, according to one embodiment of the invention, queries are rewritten to access a summary table when (1) the summary table definition and the query both call for a cumulative aggregate function, and (2) the join between the common section and the materialized view delta is one-to-many.

For example, consider the summary table ST definition (D1):

ST (l_ofk, l_sfk, sum_l_m):
 select l.ofk l.sfk, sum(lm)
 from l, o, s
 where l.ofk=o.opk (+) and l.sfk=s.spk (+)
 group by l.ofk, l.sfk;

In this definition, a table L is outer joined with both a table O and a table S. The graph of this definition can be represented as S<-L->O. Because the joins L->S and L->O are outer joins, they are guaranteed to be lossless. However, for the purpose of explanation, it shall be assumed that they are not one-to-one (i.e. neither o.opk nor s.spk are subject to a uniqueness constraint).

Because o.opk and s.spk are allowed to have duplicates, the summary table ST cannot easily be used to rewrite queries that only join L and S or queries that only join L and O. For example, in the case of a query that joins L and S, summary table ST additionally joins (L->S) to O, and will introduce duplicates that are not present in the join between L and S. Thus, the set of rows that are used to generate the aggregate values in the summary table ST is larger than the set of rows that must be used to generate aggregate values required by the query.

For example, assume that the database server receives the following query (Q1):

select l.ofk, sum(l.m)
 from l,o
 where l.ofk=o.opk (+)
 group by l.ofk;

In query Q1, the common section is L->O and the summary table delta is L->S. Because the join (L->O)->S between the common section and the summary table delta is one-to-many, some of the rows necessary to generate the sum(l.m) required by this query may have been duplicated in the summary table ST. The duplication occurs because the additional one-to-many join l.sfk=s.spk (+) contained in the summary table definition may have introduced duplicates of some of the rows that exist in the common section (L->O).

According to one embodiment of the invention, the fact that the join between the common section and the summary table delta is one-to-many is compensated for by "scaling down" the aggregate values in the summary table. To determine the factor by which the aggregate values in the summary table must be scaled down, the database server generates for each child-side row a count of how many parent side rows match the child-side row. If the child-side row matches five parent-side rows, then the child-side row will be reproduced five times in the join result. Consequently, any aggregate values that are generated based on that join result will have aggregated each of the child-side row values five times.

The count of how many parent-side rows a particular child-side row combines with may be calculated using the SQL expression:

(count (distinct Child.JoinCol||Parent.RowIdentifier))

where Child.JoinCol is the name of the child-side join column and Parent.RowIdentifier is the name of the materialized view column that contains the row identifiers of the parent-side rows. Thus, the expression to count the number of times each of the child-side rows in the L->S join is duplicated in summary table ST would be (count (distinct l.sfk||s.rowid)). In the expression (count (distinct l.sfk||s.rowid)), l.sfk designates a single value of the l.sfk=s.spk predicate, and s.rowid designates all rows of S that join with it.

The expression to count the number of times a child-side row is duplicated in a join becomes slightly more complicated when outer joins are involved, since a child-side row that matches zero parent side rows is reproduced once in the join result. Thus, the correct scaling factor for a child join column value that does not match any parent join column value is "1", even though the expression (count (distinct l.sfk||s.rowid)) would produce "0" in such cases.

To force the expression to return a "1" when the child side join value does not match any parent side join values, the following expression may be used:

count(distinct decode(Parent.RowIdentifier, null, '1', Child.JoinCol || Parent.RowIdentifier))

Stored Scale Factors

The values returned by the count expression given above, referred to herein as scaling factors, can be generated at the time the summary table is generated, and stored in the summary table itself. For example, the definition of summary table ST may be revised as follows:

ST (l_ofk, l_sfk, o_per_l, s_per_l, sum_l_m):
 select l.ofk, l.sfk,
 count(distinct decode(o.rowid, null, '1', o.ofk || o.rowid))
 count(distinct decode(s.rowid, null, '1', s.sfk || s.rowid))
 sum(lm)
 from l, o, s
 where l.ofk=o.opk (+) and l.sfk=s.spk (+)
 group by l.ofk, l.sfk;

ST has two additional columns when generated based on this revised summary table definition: o_per_l and s_per_l. For any given row in ST, the o_per_l column indicates how many rows from table O combined with the l.ofk for that row. Similarly, for any given row in ST, the s_per_l column indicates how many rows from table S combined with the l.sfk for that row.

Having stored scaling factors in this manner, query Q1 can be rewritten to access summary table ST as follows:

select l_ofk, sum(sum_l_m/s_per_l)
 from ST
 group by l_ofk;

In this rewritten query, the references to tables L and O have been replaced with a reference to ST. Because the L->O join was already performed during the creation of ST, the rewritten query requires no join. In addition, the argument to the SUM function was changed from "l.m" to "sum_l_m/s_per_l". In this example, the values in the sum_l_m column of each row of ST are divided by the scaling factor s_per_l. The s_per_l scaling factor for a given ST row is the number of rows from table S that combined with the l.sfk value in that row of ST to generate the sum_l_m value in that row. Dividing by this scaling factor has the effect of scaling down the values from sum_1_m to compensate for any duplication of rows produced when L->O was joined with S during the creation of ST.

Referring to FIGS. 9A, 9B, and 9C, they are block diagrams of tables that illustrate the use of scaling factors to rewrite queries in a way that allows the queries to access summary tables with one-to-many lossless joins. Specifically, FIG. 9A illustrates two tables: fact 900 and detail 902. FIG. 9B illustrates a summary table 904 generated based on fact 900 and detail 902 according to the definition (D2):

ST (store, sumsales, city):
    select fact.store, sum(fact.sales), detail.city
    from fact, detail
    where fact.store=detail.store (+)
    group by fact.store, detail.city;

The join contained in definition D2 is a one-to-many lossless join. The one-to-many nature of the join is due to the fact the store column in detail 902, which is the parent-side join column, is not subject to a uniqueness constraint. Hence the value "1" in the detail.store column appears twice, and the value "2" in the detail.store column appears three times.

During the generation of summary table 904, the values for the sumsales column are computed by summing the sales values for all rows that are associated with each particular store value. However, each row from fact 900 is counted every time it matches a row in detail 902. Thus, each row in fact 900 that has a store value of "1" will be counted twice, and each row in fact 900 that has a store value of "2" will be counted three times. The row in fact 900 that has a store value of "3" will be counted once, even though it does not match any row in detail 902, since the join used to generate the summary table 904 is an outer join.

Because rows from fact 900 may be produced more than once during the join, they may be counted more than once during the aggregation. Hence, the resulting aggregate values are not accurate. For example, the actual sum of sales for stores 1, 2 and 3 are $12, $18 and $12, respectively. However, the values in the sumsales column of summary table 904 for stores 1, 2, and 3 are $24, 54, and $12, respectively.

FIG. 9C illustrates a summary table 906 that is generated by the summary table definition (D2):

ST (store, sumsales, scalingfactor, city):
    select fact.store, sum(fact.sales),
    count(distinct decode(detail.rowid, null, '1', fact.store || detail.rowid))
    detail.city
    from fact, detail
    where fact.store=detail.store (+)
    group by fact.store, detail.city;

Summary table 906 reflects summary table 904 with the addition of a scalingfactor column. For each row in the summary table 906, the value in the scalingfactor column indicates how many times each child-side row that was used to create that summary table row was counted during the aggregation. For example, row 910 has a scalingfactor value of 3. Thus, all child-side rows used to generate the sumsales value in row 910 (i.e. $54) were counted three times. Stated another way, all child-side rows used to generate the sumsales value in row 910 combined with three rows in the parent-side table, and thus were each reproduced three times in the outer join results that were aggregated to create row 910.

Once a summary table with scaling factors has been generated, the summary table may be used to rewrite queries that call for cumulative aggregates. In the rewritten queries, the argument to the cumulative aggregate function is the corresponding aggregate column of the summary table divided by the appropriate scaling factor. For example, the query:

select fact.store, sum(fact.sales)
    from fact
    group by fact.store;

can be rewritten to access summary table 906 as follows:

select st.store, sum(sumsales/scalingfactor)
    from ST
    group by st.store

On the Fly Scaling

Using the technique described above, summary tables that are created using one-to-many lossless joins can be used to rewrite queries by (1) storing scaling information within the summary table, and (2) using the scaling information to scale down the cumulative aggregate values contained in the summary table. According to an alternative embodiment of the invention, the scaling information need not be pre-computed ahead of time. Rather, the query itself is rewritten in such a way that execution of the query both produces the scaling information and uses the scaling information to scale down the cumulative aggregate values contained in the summary table.

For example, query Q1 can be rewritten to access the summary table created based on definition D1 as follows:

select 1_ofk, sum(sum_1_m/s_per_1)
    from (select 1_ofk, 1_sfk, sum_1_m,
      count(distinct decode(s.rowid, null, '1', st._1_sfk || s.rowid)) as s_per_1
    from ST, s
    where st.1_sfk=s.spk (+)
    group by 1_ofk, 1_sfk, sum_1_m) v
    group by 1_ofk;

The materialized view may contain more than one one-to-many lossless join that is not contained in a query. For example, consider the query Q2:

select l.ofk, sum(l.m)
    from l
    group by l.ofk;

This type of query can be rewritten using the same technique illustrated above, but which generates on-the-fly scaling factors for each one-to-many lossless join that exists in the summary table but not in the original query. For example, the query Q2 may be rewritten as:

select 1_ofk, sum(sum_1_m/(o_per_1 * s_per_1))
    from (select 1_ofk, 1_sfk, sum_1_m,
      count(distinct decode(s.rowid, null, '1', st.1_sfk || s.rowid)) as s_per_1
      count(distinct decode(o.rowid, null, '1', st._1_ofk || o.rowid)) as o_per_1
    from ST, s, o
    where st.1_sfk=s.spk (+) and st.1_ofk=o.opk (+)
    group by 1_ofk, 1_sfk, sum_1_m) v
    group by 1_ofk;

The type of join introduced in the rewritten queries matches the join type of the corresponding join in the summary table definition. For example, if the join between L and S in the summary table was an inner join instead of an outer join, then the join introduced in the rewritten query would be the inner join st.1_sfk=s.spk.

The benefit of computing scaling factors on-the-fly is that no additional space is needed to store scaling factors within the summary tables, and existing summary tables that do not have scaling factors can also be used for rewrite. However, the additional joins required by the rewritten queries that perform on-the-fly scaling factor generation slows down query processing.

Derivable Join Types

Within a join graph, each edge in the common section corresponds to both (1) a join in the materialized view between two tables and (2) a join in the query between the same two tables. For the purpose of explanation, the join in the query that is represented by an edge in the common section is said to correspond to the join in the materialized view that is represented by the same edge in the common section.

There are many types of join operations that can be performed between two tables, including inner joins, outer joins, semi-joins and anti-joins. An anti join is an operation that produces each row in a child table that does not satisfy a join condition relative to any rows in a parent table. For example, an anti-join between T1 and T2 where the join condition is T1.col1=T2.col2 would produce each row of T1 that has a value in the col1 column that does not match any value in the col2 column of T2.

A semi join is an operation that produces each row in a child table that does satisfy a join condition relative to any rows in a parent table. For example, a semi-join between T1 and T2 where the join condition is T1.col1=T2.col2 would produce each row of T1 that has a value in the col1 column that does match any value in the col2 column of T2. Each row of T1 that satisfies the join condition relative to any rows in the parent table is produced only once, even though it may satisfy the join condition relative to many rows in the parent table.

In the previous discussion, it was assumed that each join in a query would be the same type of join as its corresponding join in the materialized view. For example, in FIG. 6C the edge within common section 618 represents a join between the Product and Sales tables. The edge is in the common section because both the query and the materialized view contain joins between the Product and Sales. It was previously assumed that the join between the Product and Sales table in the materialized view was the same type of join as the join between the Product and Sales table in the query.

According to one embodiment of the invention, under certain conditions the join compatibility test is satisfied even when the join operation in the materialized view is for a different type of join than the corresponding join in the query. Specifically, when the join type is not identical, the query rewrite mechanism determines whether the join type of the join in the query is "derivable" from the join type of the corresponding join in the materialized view. If a materialized view otherwise passes the join compatibility test and the join type of the join in the query is derivable from the join type of the corresponding join in the materialized view, then the materialized view passes the join compatibility test. However, if the materialized view otherwise passes the join compatibility test, but the join type of the join in the query is not derivable from the join type of the corresponding join in the materialized view, then the materialized view fails the join compatibility test.

According to one embodiment of the invention, the query rewrite mechanism determines that a join type in a query is derivable from the corresponding join type in the materialized view if:

(a) the join type of the join in the materialized view is an outer join and the join type of the join in the query is:
  (1) an outer join,
  (2) an inner join,
  (3) a semi join, or
  (4) an anti join; or (b) the join type of the join in the materialized view is an inner join and the join type of the join in the query is:
  (1) an inner join, or
  (2) a semi join.

Join Derivability for Materialized Aggregate Views

The scope of rewrite with Materialized Aggregate Views (summary tables) can be increased by considering join derivability. As mentioned above, some joins can be derived from other joins. For example, an inner join S><T can be derived from the outer join S->T if the latter contains anti-join markers. Anti-join markers, in this context, are values that make it possible to determine, for each row in the join result, whether or not the row was produced by combining rows of the child and the parent row.

For example, the rowids of a parent table may be used as anti-join markers. If the result of an outer join includes a column (parent_rowid) for the rowids of the parent table, then the rows in the join result that have a NULL in the parent_rowid column did not join with any parent table rows. Thus, an inner join between the same two tables using the same join condition would produce all of the rows in the outer join result that do not have a NULL in the parent_rowid column.

Given an outer join S->T the following joins can be derived:

inner join S><T. S->T must contain anti-join markers which are used for filtering out anti-join rows.

semi-join S>-T where S is left side of the semi-join. S->T must contain anti-join markers and the join key(s) of S. The latter are used for removing duplicate rows of S.

anti-join S|-T where S is the left side of the anti-join. S->T must contain anti-join markers which are used for filtering out non anti-join rows.

Similarly semi-join S>-T is derived from an inner join S><T provided that S><T contains the join key of S.

Join derivability can be used for rewriting a query that does not reference a summary table so that the rewritten query accesses the summary table. Specifically, if a summary table contains an outer join, it can be used, provided auxiliary information exists, to rewrite a query containing matching outer, inner, semi, or anti-joins.

Taking join derivability into account when determining how a query may be rewritten is important because it increases the number of queries that can be covered with a summary table. In addition, by accounting for join derivability, outer joins may be included in summary tables without significantly reducing the number of queries that can be serviced by the summary table. Further, the use of outer joins is a convenient mechanism for insuring that a join is lossless without expensive referential integrity foreign-primary key maintenance.

Outer Join to Inner Join Derivability with Summary Tables

The following examples illustrate how a query that specifies an inner join between two tables can be rewritten to access a summary table that specifies an outer join between the same two tables. Consider a summary table with an outer join S->T on S.x=T.y which groups by both join keys:

ST1:

(s_x, t_y, sum_t_m, sum_s_m) select s.x, t.y, sum(t.m), sum(s.m)

from t, s where s.x=t.y(+)

group by s.x, t.y

Suppose the database server receives a query Q1 which contains inner join S><T and which groups by the right side of the join (i.e., by t.y).

Q1:

select t.y, sum(t.m)

from t, s where s.x=t.y group by t.y

Q1 can be rewritten by filtering from the summary table ST1 the antijoin rows. In this case those are rows where s_x is null:

Q1':

select t_y, sum_t_m from ST1 where s_x is not null;

If the query contained outer join S->T and the results were grouped by the right side of the join, (i.e., by t.y):

Q2:

select t.y, sum(t.m)

from t, s where s.x=t.y(+)

group by t.y then the rewrite would involve a rollup because the child table could have multiple rows with different values of s.x that did not combine with any rows in the parent table. Thus, these rows from the child table would produce multiple rows in ST1 where t.y is a null value:

Q2':

select t_y, sum(sum_t_m)

from ST1 group by t_y

Thus a summary table that contains an outer join S->T and groups by join keys of both tables can be used to rewrite queries with matching outer and inner joins S><T which group by a join key.

In many cases the grouping key is not the join key. In these cases, anti-join markers in the summary table are used to determine whether a row in the group by came from the inner joins or the anti-joins. This allows inner joins to be derived from outer join in a summary table.

For example:

ST2(l_c, o_c, o_oj_flag, s_c, s_oj_flag, sum_l_m):

select l.c, o.c, decode(o.rowid, null, 'a', 'i'), s.c, decode(s.rowid, null, 'a', 'i'), sum(l.m) as sum_l_m from l,o,s where l.ofk=o.opk(+) and l.sfk=s.spk(+)

group by l.c, o.c, decode(o.rowid, null, 'a', 'i'), s.c, decode(s.rowid, null, 'a', 'i');

This summary table contains outer joins S<-L->O. It joins by l.ofk=o.opk(+) and l.sfk=s.spk(+) and groups by l.c, o.c, s.c. The summary table includes anti-join markers decode(o.rowid, null, 'a', 'i') which mark with 'a' and 'i' anti-join rows and inner join rows of L->O respectively. Similar markers are generated by the statement "decode(s.rowid, null, 'a', 'i')" to distinguish between the anti-join rows and the inner join rows produced by the join L->S.

Using these markers, queries which contain matching inner joins can be rewritten. For example, the following query Q3 with L><O:

Q3:

select l.c as l_c, o.c as o_c, sum(l.m) as sum_l_m from l, o where l.ofk=o.opk group by l.c, o.c;

can be rewritten as

Q3':

select l_c, o_c, sum(sum_l_m)

from ST2 where o_oj_flag='i' group by l_c, o_c;

The ability to rewrite queries to access summary tables containing outer joins is important, particularly because outer joins are, by definition, lossless with respect to the child table. Consequently, expensive referential integrity foreign-primary key constraints do not have to be maintained to enable the rewrite.

Outer/Inner Join to Semi Join Derivability with Summary Tables

A summary table can be used to satisfy not only a join but also a semi-join. Consider this query:

Q4:

select o.c, sum(o.m)

from o where o.opk in (select l.ofk from l, s where l.sfk=s.spk and s.spk='s1')

group by o.c;

It can be answered by a summary table containing join O><L on o.opk=l.ofk that groups (among others) by o.c. For example, consider this summary table that joins S><L><O:

ST3 (l_ofk, l_sfk, o_c, sum_o_m, count_o_c):

select l.ofk, l.sfk, o.c, sum(o.m), count(o.c)

from l, o, s where l.ofk=o.opk and l.sfk=s.spk group by o.c, l.ofk, l.sfk;

Assume that joins L><O and L><S are one-to-one lossless. This summary table, in addition to aggregate sum(o.m), has count(o.c) which is necessary for the rewrite.

Query Q4 can be answered as:

Q4':

select o_c, sum(sum_o_m/count_o_c)

from ST3 where l_sfk='s1' group by o_c;

The semantic of the semi-join has been simulated using (sum_o_m/count_o_c). The count_o_c serves as the scaling factor for the semi-join. Thus, for the rewrite of a query containing a semi-join using a summary table with inner or outer join, additional scaling columns in the summary table are needed. The additional scaling columns have to store the count of the group by columns, e.g., in ST3 count(o.c) was stored.

If ST3 contained an outer join, L->O and corresponding anti-join markers like in the following ST4:

ST4 (l_ofk, l_sfk, o_c, o_oj_flag, sum_o_m, count_o_c):

```
select l.ofk, l.sfk, o.c, decode(o.rowid, null, 'a', 'i'),
    sum(o.m) count(o.c)
from l, o, s
where l.ofk=o.opk and l.sfk=s.spk
group by o.c, decode(o.rowid, null, 'a', 'i'), l.ofk, l.sfk;
```
then the rewrite of Q4 would filter out the anti-join group by rows as follows:

Q4":
```
select o_c, sum(sum_o_m/count_o_c)
from ST4
where l_sfk='s1' and o_oj_flag='i'
group by o_c;
```

Outer Join to Anti Join Derivability with Summary Tables

Assume a query with an anti-join is defined as follows:

Q5:
```
select o.c, sum(o.m) from o
    where o.opk not in (select l.ofk from l, s
        where l.sfk=s.spk)
group by o.c;
```

Suppose a summary table ST5 includes an outer join o->l as follows:

ST5 (o_c, o_opk, s_spk, l_oj_mark, sum_o_m):
```
select o.c, o.opk, s.spk, decode(l.rowid, NULL, 'a', 'i'),
    sum(o.m)
from o, l, s
where o.opk=l.ofk (+) and s.spk=l.sfk
group by o.c, o.opk, s.spk, decode(rowid, NULL, 'a',
    'i');
```

Assuming that l.ofk is subject to a NOT NULL constraint, Q5 can be rewritten in terms of summary table ST5 as:

Q5':
```
select o_c, sum(sum_o_m) from ST5
    where (l_oj_mark='a' and o_opk is not null)
group by o_c;
```

The predicate "l_oj_mark='a'" selects only anti-join rows from ST5, and the predicate "o_opk is not null" excludes those anti-join rows that have null in o_opk. The exclusion of anti-join rows with null in o_opk by the rewritten query is necessary because the original query Q5 would not have produced such rows in its result.

If the query had included a condition that restricted the result of the join l><s then its result will also contain some inner join rows in addition to the anti-join rows. For example, consider the following query:

Q6:
```
select o.c, sum(o.m) from o
    where o.opk not in (select l.ofk from l, s
        where l.sfk=s.spk and s.spk='s1')
group by o.c;
```

The result of this query includes antijoin rows as well as some rows from o that have o.opk value matching with l.ofk value in l rows. This means the rewritten query must select some inner join rows in addition to anti-join rows from the summary table. Because inner join rows in a summary table could be duplicated, it is necessary to also maintain scale factor for each grouping column as shown below:

ST6 (o_c, o_opk, s_spk, l_oj_mark, scale_o_c, sum_o_m):
```
select o.c, o.opk, s.spk, decode(rowid, NULL, 'a', 'i'),
    count(o.c),
sum(o.m)
from o, l, s
where o.opk=l.ofk (+) and s.spk=l.sfk
group by o.c, o.opk, s.spk, decode(rowid, NULL, 'a',
    'i');
```

Now Q6 can be rewritten in terms of ST6 as:

Q6':
```
select o_c, sum(sum_o_m/scale_o_c) from ST5
    where (l_oj_mark='a' and o_opk is not null) or
        (l_oj_mark='i' and not (s_spk='s1'))
group by o_c;
```

In the rewritten query Q6' in addition to the anti-joins, only those inner join rows from ST5 are selected for which the condition s_spk='s1' does not hold. Also, the aggregate value associated with such inner join rows is scaled down to remove the effect of duplication due to the join between o and l in ST6.

Empirically Derived Constraints

Typically, database users explicitly specify the constraints on the columns of the tables that they create. However, according to one embodiment of the invention, the database server stores data that indicates whether a constraint is satisfied by a column even though the user has not specifically declared the constraint on the column.

For example, at the time a materialized view is created, the database server may track whether all values in a particular column are unique. If all values are unique, the database server may save metadata for the table that indicates that the particular column satisfies a uniqueness constraint. Whenever the materialized view is subsequently changed (e.g. during an incremental refresh operation), the changes are inspected to determine whether the uniqueness constraint is still satisfied. If any change violates the uniqueness constraint, then the metadata is revised so that it no longer indicates that the particular column is unique.

The technique of empirically identifying undeclared constraints may be used for numerous types of constraints, including uniqueness constraints, non-null constraints, and foreign key constraints. Significantly, these are the very constraints that may be used to determine whether a join is lossless and/or one-to-one. Thus, according to one embodiment of the invention, the metadata that indicates empirically derived constraints is consulted in combination with expressly declared constraint information to determine whether a particular join is lossless and/or one-to-one.

Similar to empirically identifying undeclared constraints, the database system may empirically identify one-to-one and lossless characteristics of joins within a materialized view. Each join in the materialized view may have a corresponding lossless flag and a one-to-one flag. The lossless flag for a join would be set if, during the initial build of the materialized view, all rows in the child table join with at least one row of the parent table. The one-to-one flag would be set if all rows in the child table join with exactly one row of the parent table. During refreshes of the materialized view, the flags would be altered appropriately based on whether any rows of the child table were lost or duplicated during the join.

Aggregate Computability

When determining whether a materialized aggregate view (i.e. a summary table) that is not referenced in a query can be used to process the query, an "aggregate computability" test must be performed. In SQL, an aggregate represents a function with a single argument. For example, SUM(E) is an aggregate with SUM being a function and E being the argument to the function SUM. E can be, for example, a simple column or an arbitrary arithmetic expression. SUM (A) sums up all values of column A. SUM(A+B) sums up all computed values of the expression A+B, where A and B are simple columns.

The issue of aggregate computability arises from the fact that it may be possible to use a summary table to process a query even though the aggregate functions and the arguments to the aggregation functions in the query are not identical to the aggregate functions and the arguments to the aggregate functions in the summary table.

With respect to aggregate functions, aggregate computability requires that the aggregate functions within a query be "derivable" from the aggregate functions in the summary table definition. An aggregate function is derivable from one or more other aggregate functions if the results of the aggregate function can be computed from the results of the one or more other aggregate functions. For example, AVG (E) can be computed from SUM(E) and COUNT(E) using the expression SUM(E)/COUNT(E). Similarly, STDDEV (E) can be computed from VARIANCE(E) using the expression SQRT(VARIANCE(E)) where SQRT is a function which finds the square root of its argument.

The possible existence of null values must be taken into account when determining whether a function can be derived from other functions. For example, it may initially appear that the function SUM(A+B) can be derived from the functions SUM(A) and SUM(B). However, if it is possible for A or B to have null values, SUM(A+B) cannot be derived from SUM(A) and SUM(B). For example, assume that only the following three rows exist: <5, Null>, <Null, 10>, <3,4>, where the first value is from the A column and the second value is from the B column. In this case, SUM(A+B) would yield SUM(Null, Null, 7)=7. This is because a Null added to any number produces a Null. In contrast, SUM(A)+SUM(B) would yield SUM(5, Null, 3)+SUM(Null, 10, 4)=8+14=22.

Argument Equivalence

For the purposes of explanation, an aggregate function in a query is said to "correspond to" the one or more aggregate functions in the summary table definition from which it may be derived. For example, assume that a query has the aggregate functions SUM(A) and AVG(B), and that a summary table definition has the aggregate functions SUM(A), SUM(B), COUNT(B). Under these conditions, the SUM(A) function in the query would correspond to the SUM(A) function in the summary table definition. The AVG(B) function in the query would correspond to the SUM(B) and COUNT(B) functions in the summary table definition.

With respect to arguments, aggregate computability requires that arguments for the aggregate functions in the query be "equivalent to" the arguments for the corresponding aggregate functions within the summary table definition. An argument is equivalent to another argument when it necessarily produces the same result. For example, the summary table definition may specify SUM(A+B), while the query specifies SUM(B+A). In this case, the arguments to the SUM function are not identical, but are "equivalent".

Figure 7:
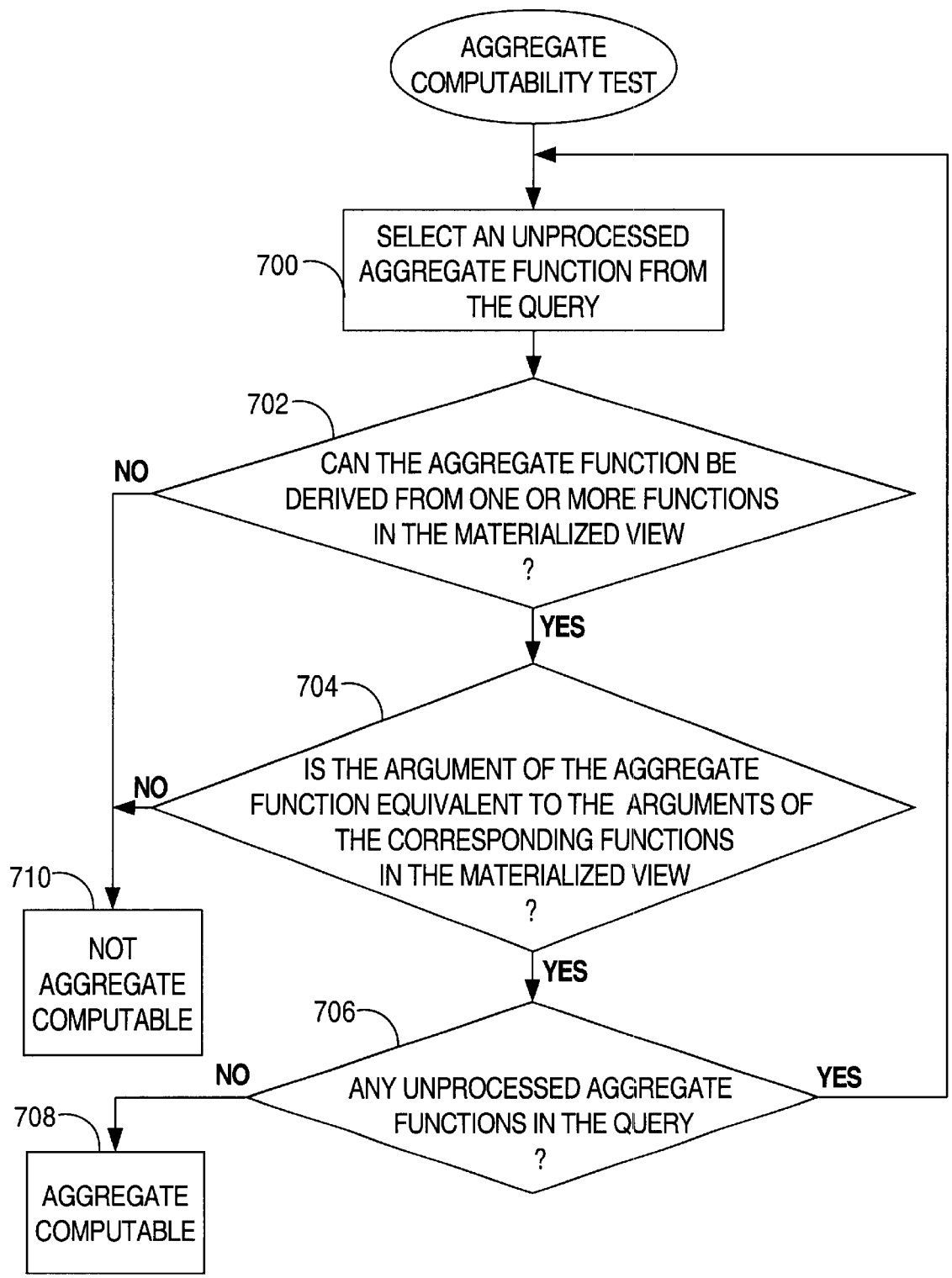
FIG. 7 is a flow chart illustrating steps for performing an aggregate compatibility test according to an embodiment of the invention.

Referring to FIG. 7, it is a flowchart that illustrates steps for determining whether a materialized view satisfies the aggregate computability test relative to a query. At step 700, an unprocessed aggregate function from the query is selected. For the purpose of explanation, it shall be assumed that the aggregate function AVG(A+B) is selected at step 700.

At step 702, it is determined whether the selected aggregate function can be derived from one or more aggregate functions contained in the materialized view. For the purpose of explanation, it shall be assumed that the materialized view contains the aggregate functions AVG(A), AVG(B), COUNT(B+A) and SUM(A). The aggregate function AVG is derivable from COUNT and SUM, so control passes to step 704.

At step 704, it is determined whether the argument in the selected aggregate function is equivalent to the arguments of the one or more corresponding aggregate functions in the materialized view. In the present example, the argument in the selected aggregate function is A+B. The arguments in the corresponding aggregate functions COUNT and SUM are B+A and A, respectively. The argument B+A is equivalent to A+B, but the argument A is not. Therefore, control passes to step 710 and it is determined that the materialized view is not aggregate computable relative to the query.

Steps 700 and 706 form a loop in which each aggregate function in the query is processed. If any aggregate function in the query cannot be derived from the aggregate functions in the materialized view, or if any aggregate function in the query has an argument that is not equivalent to the corresponding aggregate functions in the materialized view, then control will pass to step 710 where the materialized view is held to be not aggregate computable. On the other hand, if all aggregate functions in the query can be derived from aggregate functions in the materialized view, and all aggregate functions in the query have arguments that are equivalent to the corresponding aggregate functions in the materialized view, then control will pass to step 708 where the materialized view is held to be aggregate computable.

It should be noted that the order of the steps illustrated in FIG. 7 may be altered to achieve the same result. Specifically, for any given aggregate function in the query, the database server may first proceed to identify all aggregate functions in the summary table definition that have equivalent arguments. Once the set of aggregate functions that have equivalent arguments has been determined, the database server may determine whether the selected aggregate function of the query can be derived from one or more of the aggregate functions in the summary table definition that have equivalent arguments.

Determining Argument Equivalence

The computational complexity to determine equivalence between two arbitrary expressions is infinite. However, the complexity is significantly reduced by adopting techniques that work with each single expression separately, rather than working with two expressions at the same time. According to one aspect of the invention, equivalence of arguments is established by comparing "canonical" forms of the arguments, rather than by attempting to directly compare two expressions.

According to one aspect of the invention, techniques are provided for rewriting the arguments of aggregate functions. Specifically, arguments are transformed in a way that maps equivalent arguments to the same transformed argument. These transformed arguments thus produced can be compared to determine, for example, whether the aggregation arguments contained in a query are equivalent to the aggregation arguments specified in the corresponding aggregate functions in the definition of a summary table.

During the transformation, arithmetic transformation rules, such as associativity, commutativity and distributivity, are used to reduce the argument of each aggregate function within the summary table definition to a canonical form. According to one embodiment, the transformation of the arguments of the summary table definition are performed at the time the summary table is created. Once generated, the transformed arguments are persistently stored as metadata associated with the summary table.

When a query is received, the argument of each aggregate function in the query is also transformed into the canonical form. The transformed versions of the query's arguments are compared with the transformed versions of the summary table definition's arguments. If the transformed arguments from the query match the transformed arguments of corresponding aggregate functions in the summary table definition, then the arguments are equivalent.

Various techniques may be used to perform the comparison between the transformed arguments in the query and the corresponding transformed arguments in the summary table definition. According to one embodiment, equivalence is determined by performing a byte for byte comparison between the canonical forms of the arguments.

Transforming Arguments to a Canonical Form

Typically, both summary table definitions and user queries are submitted to the database server as statements that conform to a particular database language, such as SQL. The database language will dictate the format of the arguments of the aggregate functions in the statements. Typically, database languages specify a format that makes the arguments understandable to humans. For example, SQL uses words such as "SUM( )" to specify function identifiers. Similarly, descriptive words such as "Product.product_id_key" may be used as column identifiers. In addition, conventional symbols such as "+" and "−" may be used as operators.

While this notation is convenient for humans, it is unnecessarily verbose as far as the database server is concerned. Therefore, according to one embodiment of the invention, a preliminary step in the transformation of arguments to a canonical form involves replacing SQL identifiers with more compact identifiers that have the same meaning. For example, the internal unique identifier for a particular column may be a two-byte column-in-table identifier combined with a four-byte table identifier, while the SQL identifier for the same column is the text string "Product.product_id_key". The internal representation of that text string would take significantly more space than six bytes. Therefore, as part of the transformation the text string is replaced with the six byte value.

Conventional "canonical" forms of expression, such as reverse polish notation, do not dictate the order of operands of a commutative operation. For example, addition is commutative. Both +AB and +BA are valid reverse polish representations of the expressions A+B and B+A. Even though these expressions are logically equivalent, they may be transformed into valid reverse polish representations that do not match.

In contrast, embodiments of the present invention use transformation techniques that map equivalent expressions (e.g. A+B and B+A) to a single transformed expression. To accomplish this, the transformation techniques sort the operands of commutative operations. Thus, A+B and B+A both transform to +AB, rather than +AB and +BA.

Such a commutative transformation can be accomplished by sorting the operands of commutative operations according to any aribrary sort key, provided that the resulting sort order is deterministic (reproducible). According to one embodiment of the invention, the internal numeric identifiers of the terms of the expression are sorted in ascending order.

Conventional "canonical" forms of expression, such as reverse polish, unnecessarily distinguish associatively equivalent representations. For example, (A+B)+C is equivalent to A+(B+C). The reverse polish form of these expressions is AB+C+ and ABC++, respectively. While algebraically equivalent, the conventional "canonical" forms of representation differ. According to one embodiment of the invention, multiple instances of associative N-ary operators, where N is the number of operands for the operator, can be combined into a single Nm-ary operator, where Nm is the sum of the count of operands for all the associative operators to be transformed. For example, the reverse polish forms AB+C+ and ABC+, where + is a binary addition operator, could both be transformed to a common representation of ABC+3, where the +3 form represents an addition operator with three operands.

Conventional "canonical" forms of expression, such as reverse polish, unnecessarily distinguish distributatively equivalent representations. For example, A*(B+C) is equivalent to (A*B)+(A*C). The reverse polish for these expressions is ABC+* and AB*AC*+, respectively. The former representation is referred to herein as the "undistributed" representation, and the latter representation is referred to herein as the "distributed" representation. While algebraically equivalent, the conventional "canonical" forms of representation differ. According to one embodiment of the invention, each expression or sub-expression that can be distributed is distributed. For example, A*(B+C) is transformed to (A*B)+(A*C). According to an alternative embodiment, each distributed expression or sub expression is undistributed. For example, (A*B)+(B*C) is transformed to A*(B+C).

Conventional "canonical" forms of expression, such as reverse polish, unnecessarily distinguish many other equivalent representations. For example, A+0 is euqivalent to A. The reverse polish for these expressions is A'0'+ and A, respectively. Another example is A+A and A*2. the reverse polish for these expressions is AA+ and A'2'*, respectively. Many other algebraically equivalent possibilities exist.

When dealing with environments that support the concept of nullness, such as SQL language expressions, care must be taken with respect to identifying equivalent expressions. For example, A*0 is algebraically equivalent to 0. However, A*0 is not equivalent to 0 in SQL languages unless it can be proven that A can never be null. A might be proven to be non-null, for example, through exhaustive examination of values in A, or through analysis of constraint information in the metadata for A. The reason for potential non-equivalence is that A*0=null value if A is null, and A*0=0 if A is not null. According to an embodiment of the invention, in environments that support nullness, certain algebraic transformations are made dependent upon the provability of non-nullness of certain terms of the expression or sub-expression. In environments that do not support nullness, those same algebraic transformations are made without such consideration. In all environments, these considerations apply only to transformations that involve the elimination of one or more terms that can assume a null value.

Grouping Compatibility and Aggregate Rollup

When both a query and a materialized view contain grouping, a grouping compatibility test is performed to determine whether the materialized view is eligible to be used in rewriting the query. According to one aspect of the invention, a "grouping compatibility" test is performed by determining whether each grouping column in the query either (1) exactly matches a grouping column in the materialized view, (2) is functionally dependent on another grouping column in the query, or (3) is functionally dependent on a grouping column in the materialized view.

The grouping compatibility rule hinges on the fact that generalities can be derived from specifics, but specifics cannot be derived from generalities.

Note that it is trivial to match a query with no grouping to a materialized view with grouping. In this case the grouping compatibility is always satisfied because all grouped aggregate values in a materialized view can be rolled up into a single aggregate value.

A first column is functionally dependent on a second column when there is a one-to-N mapping of values from the first column to values in the second column. Such functional dependencies may exist between columns of the same table, or between columns that belong to different tables. For example, each possible value for a month column corresponds to a particular set of values in a day column. Therefore the month column is functionally dependent on the day column. Similarly, each value in a year column would correspond to a particular set of values in a month column, and to a particular set of values in the day column. Consequently, the year column is functionally dependent on both the month column and the day column.

The one-to-N mapping of a functional dependency may be one-to-one. For example, assume that every row in a Product table had a unique, non-null product number (prod_key) and a unique, non-null product name (prodname). Under these conditions, the prod_key and prodname columns are functionally dependent on each other.

Consider a query that includes "SUM(sales) group by month". A summary table that includes "SUM(sales) group by day" is grouping compatible with the query, since the sums of sales for each month can be derived from the sums of sales for each day. In contrast, a summary table that includes "SUM(sales) group by year" is not grouping compatible with the query, since the sums of sales for each month cannot be derived from the sums of sales for each year.

Queries may group based on more than one column. For example, a query may specify "SUM(sales) group by region, month". This query requires a separate value for each region/month combination. A summary table would not be grouping compatible with this query if it only included "SUM(sales) group by month", since such a summary table would only contain a single value per month for all regions. On the other hand, a summary table would be grouping compatible with this query if it included "SUM(sales) group by day, location, product" (assuming that "month" is functionally dependent on "day" and "region" is functionally dependent on "location").

Aggregate rollup is required if there is at least one grouping column in the query that is functionally dependent on a grouping column in the summary table, or there is at least one column in the summary table that neither matches exactly with a grouping column in the query nor functionally depends on some other grouping column in the summary table.

Conversely, no aggregate rollup is required if each grouping column in the query either matches exactly with a grouping column in the summary table or is functionally dependent on some other grouping column in the query.

When no aggregate rollup is required, the group by clause of the query may be dropped. Otherwise, it should be retained in the rewritten query.

For example, if a query that specifies "SUM(sales) from T1 group by month, region" is rewritten to access a summary table ST that reflects "SUM(sales) from T1 group by day, region, product", then the rewritten query would specify "SUM(sumsales) from ST group by month, region". When this rewritten query is executed, the database server "rolls up" the more specific (finer) aggregate values in the summary table to the more general (coarser) aggregate values required by the query.

Roll Up of Complex Aggregates

Many database systems provide support for rolling up certain types of aggregates, such as SUM, COUNT, AVG, MIN and MAX. For example, it is well known that an average can be derived by dividing a sum with a count. However, according to one embodiment of the invention, a database system is provided that is configured to derive certain types of aggregates that are not derivable in conventional database systems.

Specifically, a technique is provided for determining a variance (VAR) or standard deviation (STDDEV) for a target population from the VAR, SUM, and COUNT of a source population when the target population is functionally dependent on the source population. For example, the variance for each combination of <year, state> can be computed given the variance, count, and sum by <month, city, product>.

VAR(x) is defined in terms of count(x), sum(x), and sum(x*x). Sum(x*x) can be determined from the other three quantities when count(x)>1. When count(x) is 1, VAR(x) is defined to be zero and therefore sum(x*x) cannot be determined; however, in this case sum(x*x) is equal to sum(x)*sum(x), so therefore sum(x*x) can always be determined from VAR(x), sum(x), and count(x).

Given that sum(x*x), sum(x), and count(x) are available in the source population, sum(x*x), sum(x), and count(x) can be determined in the functionally dependent target population by summing the sums and counts and recomputing the new VAR(x).

Specifically, the formula for computing variance based on sum and count is:

$$\text{Variance} = \frac{\text{sum}(x^2) - \frac{[\text{sum}(x)]^2}{\text{count}(x)}}{\text{count}(x) - 1}$$

The formula for standard deviation based on variance is:

standard deviation=$\sqrt{\text{variance}}$

To accommodate variance, tables with a variance column usually include a count column and a sum column. However, typically there is no column for sum(x*x). When rollup is performed, multiple rows are combined into one row of the result. The sum(x*x) for a given row is computed based on the variance, sum and count for that row. Once sum(x*x) has been determined, the row can be rolled up with other rows according to the formula:

$$\text{roll up variance} = \frac{\text{sum}(\text{sum}(x^2)) - \frac{\text{sum}([\text{sum}(x)]^2)}{\text{sum}(\text{count}(x))}}{\text{sum}[\text{count}(x)] - 1}$$

Once the variance is rolled up using this technique, the standard deviation may be derived simply by taking the square root of the variance.

Data Sufficiency and Join Back

The most efficient way to process a query may involve accessing a materialized view that does not contain all of the data required to process the query. For example, a query that requests yearly sales totals may be processed most efficiently by accessing a summary table that contains monthly sales totals. If the summary table does not have a column indicating the year to which each month belongs, then the query cannot be processed exclusively based on the information contained in the summary table.

According to one embodiment, techniques are provided for rewriting queries to retrieve data from a materialized view under these circumstances. However, because the materialized view does not contain all of the data necessary to process the query, the object referenced in the original query that contains the column that has the "missing information" continues to be referenced in the rewritten query. Specifically, the rewritten query includes a join clause that causes the materialized view to be "joined back" to an object that contains the required data that is missing from the materialized view.

For example, assume that a summary table ST is defined by Query7:

QUERY7 select month, sum(sales) sum_sales
from fact, time
where fact.time_key=time.time_key
group by month ST therefore contains two columns: month, and sum_sales. Each row in ST includes a value that identifies a particular month, and the sum of all sales that occurred in that particular month (as recorded in the "fact" table).

Assume that the database server receives Query8:

QUERY8 select year, sum(sales)
from fact, time
where fact.time_key=time.time_key
group by year Query8 requires the generation of the sum of sales by year. The sum of sales for each year can be derived from the sum of sales for each month contained in ST, if the database system knows to which year each month belongs. Specifically, ST contains the sum of sales by month for each month in a particular year. By summing those monthly totals for all months in a given year, the total sum for that given year is generated.

The month-to-year mapping must be known in order to execute query8 using values from ST. In addition, each row returned in response to query8 must have the form <year_val, sales_sum>, where year_val is a year identifier and sales_sum is the sum of sales for that particular year. Unfortunately, ST does not store year values. Consequently, while values in ST can be used to generate the yearly sales_sum values, a join back to the "time" table must be performed in order to establish the month-to-year mapping and to obtain the year values.

For the purpose of explanation, the table that contains the values that are necessary to process the query, but that are not in the materialized view, shall be referred to herein as the join-back table. The column of the join-back table that contains the values required to process the query is referred to as the desired column. To perform the join back, a column in the summary table must be joined back to a column in the join-back table. The column in the join-back table to which the summary table is joined is referred to herein as the join-back key.

According to one aspect of the invention, two types of join back operations are supported: simple join back and complex join back. Which of the two types of join back operations to use in a particular situation hinges on whether the join key is unique in the join-back table. If the join key is unique in the join-back table, a simple join back may be performed. If the join key is not known to be unique in the join-back table, a complex join back is performed.

Returning to the example given above, assume that the Time table has columns Month and Year. If the month column of the Time table is subject to a uniqueness constraint, then query8 can be rewritten to access the summary table ST using a simple join back to the Time table as follows:

QUERY9 select year, sum(sum_sales)
from ST, time
where ST.month=time.month
group by year In Query9, the references to the Fact table in Query8 have been replaced with references to the summary table ST. In addition, the argument to the SUM function has been changed from the name of the column of Fact to be summed (i.e. sales), to the name of the column of ST to be summed (i.e. sum_sales).

On the other hand, assume that the Time table has columns Day, Month, Year. The Month values are not subject to a uniqueness constraint because the rows associated with numerous different days may all specify the same month. Under these conditions, the query is rewritten to access the summary table using a complex join back to the Time table as follows:

QUERY10 select year, sum(sum_sales)
from ST, (select distinct month, year from time) v
where ST.month=v.month
group by year Similar to Query9, in Query10 the references made by Query8 to the Fact table have been replaced with references to the summary table ST and the argument to the SUM function has been changed from the name of the column of Fact to be summed (i.e. sales) to the name of the column of ST to be summed (i.e. sum_sales). In addition, Query10 replaces the references to the join-back table (i.e. Time).

Specifically, Query10 replaces the reference to the join-back table in the "from" clause with a view definition. All subsequent references to the join-back table are replaced with references to the view.

In this example, the view definition defines a view that contains one row for every distinct month value in the Time table. Within the view, the row for a given month includes the month identifier for the month and the year identifier for the year to which the month belongs. Because each row in the view is for a distinct month value, the values in the month column of the view are, by definition, unique. Therefore, no month will be double-counted when the monthly values in ST are combined to create the yearly sum of sales values.

In the preceding examples, the desired column appeared in the group by clause of a received query. However the desired column may appear in many places within the received query. For example, consider a system in which a summary table is defined by query7, and the database server received query11:

QUERY11

```
select month, sum(sales)
from fact, time
where fact.time_key=time.time_key and
    time.year>1970
group by month
```

In this case, the time.year column is the desired column, not because the sales have to be summed by year, but because only the monthly sums for years greater than 1970 are desired. In this case, query11 can be rewritten to access ST as illustrated by query12:

QUERY12

```
select ST.month, ST.sum_sales
from ST, (select distinct month from time) v
where ST.month=v.month and
    v.year>1970
```

Note that the GROUP BY clause in rewritten query12 is not present because of exact matching of grouping columns between query11 and MV (query7).

Normalization and Denormalization

Whether a join-back key will be unique in a join-back table frequently depends on whether the query refers to a table in a schema that has been "normalized". In general, a normalized schema stores different levels of information in different tables to avoid redundantly storing information. On the other hand, a denormalized schema contains information in fewer tables with more columns, where some of the columns store redundant information.

For example, a denormalized schema may have a table that has a row for every city, where each row has a "county info" column. The rows for all cities in each given county would have the same information in their "county info" column. In a normalized schema, a separate "county" table would be created that has one row per county. The "county info" would be stored in the county table. Because the county table has only one row per county, the "county info" for any given county would not be repeated. The difference between a normalized and a denormalized schema is illustrated in FIGS. 8A, 8B and 8C.

Referring to FIG. 8A, it illustrates a fact table 800. The fact table 800 includes records that correspond to individual product sales. For each sale, fact table 800 includes a unique identifier ("fact_key"), a time_key that indicates the time at which the sale was made, a product_key that indicates the product sold, and a "sales" value that indicates the price of the sale. Of these values, only the fact_key is unique for a given sale, since more than one sale can be made at any given time, and any given product type can be the subject of more than one sale.

The database may also store information that is relevant to specific months and specific years. It would be inefficient to store this information in the fact table 800 itself, since the monthly information for a given month would have to be duplicated in the row for every sale made in that month. Similarly the yearly information for a given year would have to be duplicated in the row for every sale made in that year.

To reduce this duplication, the month and year specific information could be broken out into a separate table. FIG. 8B shows a Time table 802 that includes the month and year information. The time_key may indicate, for example, the particular day that a sale was made on. Time table 802 includes one row for every time_key value. Each row indicates the month and year associated with the time_key, and the month information and year information for that month and year.

By placing the month and year specific information in time table 802, the need to duplicate this information on a per-sale basis is avoided. However, time table 802 still duplicates this information on a per-day basis. For example, every time_key value associated with month 1/98 will duplicate the monthly information for month 1/98. Similarly, every time_key value associated with year 1998 will duplicate the yearly information for year 1998.

Referring to FIG. 8C, it illustrates how the time information can be broken out into multiple tables: Time table 804, Month table 806 and Year table 808. Time table 804 includes one entry for every time_key value, similar to Time table 802. However, Time table 804 does not attempt to store the month and year specific information. Rather, the month-specific information is stored in Month table 806, that includes one row for every month, and the year-specific information is stored in Year table 808, that includes one row for every year.

The process of breaking out information into multiple tables to avoid duplication, as shown in FIG. 8C, is known as normalization. Schemas that do not break the information out in this manner, as shown in FIG. 8B, are referred to as "de-normalized" schemas.

In de-normalized schemas, the join-back key will often not be unique, and therefore a complex join back operation will be required if the query is rewritten to access a summary table. For example, assume that a database includes fact table 800, time table 802, and a summary table ST that includes the sum of sales by month. Queries that require the sum of sales by year that are rewritten to access the summary table will have to join back to Time table 802, where the join is between the month column of the summary table and the month column of Table 802. Since the month column of Time table 802 is not subject to a uniqueness constraint, a complex join back is required.

In contrast, assume that a database includes fact table 800, time table 804, month table 806, Year table 808 and a summary table ST that includes the sum of sales by month. Queries that require the sum of sales by year that are rewritten to access the summary table will join back to Month table 806, where the join is between the month column of Month table 806 and the month column of the summary table ST. Since the month column of Month table 806 is subject to a uniqueness constraint, a simple join back may be performed.

Functional Dependencies

When a first column is functionally dependent on a second column, aggregate values that have been created by grouping based on the second column can be used to derive aggregate values that are grouped based on the first column. For example, the monthly sum of sales can be used to derive the yearly sum of sales. Stated another way, monthly sum of sales values can be "rolled up" to create yearly sum of sales values.

Roll up paths are sequences of columns arranged in a hierarchy that reflects the functional dependencies between the columns. For example, a "year" column may be functionally dependent on a "month" column, which is functionally dependent on a "day" column, which is functionally dependent on a "time_id" column. These functional dependencies constitute the roll-up path of: time_id-day-month-year.

According to one embodiment, the database system stores "functional dependency metadata" that indicates the functional dependencies between columns. The functional dependency metadata may be generated by the database system automatically based on primary key constraint information, or explicitly declared by a user. The functional dependency metadata reflect functional dependencies between columns that belong to the same table, as well as between columns of different tables.

When a query requires grouping to be performed based on values that are not stored in a summary table, the database system inspects the functional dependency metadata to determine whether it is possible to use the join back techniques described above to rewrite the query to access the summary table. Specifically, if the group by column specified in the query is functionally dependent on a column in the summary table, the query can be rewritten to include a join back between the summary table and the table that contains the group by column specified in the query. For example, assume that the functional dependency information indicates the existence of the following roll up path:

time_id-second-minute-hour-day-month-year-century

Assume that the summary table has sale values grouped by minute, while a query requires the sales values to be grouped by century. In this case, the database server reads the functional dependency metadata to determine that "century" is dependent on "minute", and rewrites the query to roll up the sales values in the summary table to produce sales values grouped by century.

In a normalized schema, a "time" table may have time_id and second columns, a "second" table may have second and minute columns, a "minute" table may have minute and hour columns, an "hour" table may have hour and day columns, a "day" table may have day and month columns, a "month" table may have month and year columns, and a "year" table may have year and century columns. Under these conditions, the summary table is joined back to the minute table and eventually to the year table using multiple join conditions:

ST.minute=minute.minute minute.hour=hour.hour hour.day=day.day day.month=month.month month.year=year.year In this case, the minute table is the join back table. Assuming that the minute column in the minute table is subject to a uniqueness constraint, only a simple join back would be required. However, if the minute column of the minute table is not subject to a uniqueness constraint, then a complex joinback in the rewritten query would be required, as shown below:

from ST, (select DISTINCT minute.minute, year.century
 from minute, hour, day, month, year
 where minute.hour=hour.hour
 and hour.day=day.day
 and month.year=year.year) v
where ST.minute=V.minute

Rewriting Outer Joins with Child-Side Dimension Tables

In the preceding sections, query rewrite techniques have been described with respect to queries that include an outer join between fact and dimension tables, where the fact table is on the child side of the outer join. Under these conditions, the outer join preserves all fact rows, and therefore guarantees that no rows in the fact table will be lost due to the join.

However, a user query may specify an outer join between fact and dimension tables, where the dimension table is on the child side of the outer join. These types of queries are typical in data warehouse environments. The result of an outer join in which the child-side table is a dimension table and the parent-side table is a fact table preserves all of the rows in the dimension table. For example, a user may request the sum-of-sales by product. It is highly desirable to list all products in such a list, including those products for which no sales occurred. To accomplish this, a query can be constructed in which the product table is on the child-side of an outer join, and the sales table is on the parent-side of the outer join.

Just as with the other types of queries discussed above, the most efficient way to handle these types of queries may be to retrieve data from materialized views that are not referenced in the original queries. The following is an illustration of a technique for rewriting such queries to access a materialized view that is not referenced by the original query. Assume that the materialized view is a summary table that is defined as follows:

create summary sales_summary (prod_id, sum_sales)
 as
 select products.prod_id, sum(fact.sales) from fact, products
 where fact.prod_id=products.prod_id (+)
 group by fact.prod_id;

Assume that the database server receives the following query:

select products.prod_id sum(fact.sales) from fact, product
 where (+) fact.prod_id=products.prod_id
 group by products.prod_id In this example, the outer join in the summary is different from the outer join in the query. Specifically, the summary contained the join "fact->products", while the query specified the join "products->fact". Because some rows from the products table may have been lost in the "fact->products" join of the summary, the summary does not necessarily have all of the values from the products.prod_id column. However, the query requires sales to be grouped based on values from the products.prod_id column. Consequently, to use the summary table to process the query, the summary table is joined back to the products table.

Upon receiving the query, the database server performs the relevant eligibility tests (described above) on the summary table to determine whether the summary table is eligible to be used to rewrite the query. In the present example, the summary satisfies the eligibility tests, and the query can be rewritten as follows:

select products.prod_id, sales_summary.sum_sales
 from sales_summary, products
 where (+) sales_summary.prod_id=products.prod_id;

The outer join (products->summary) in the rewritten query accomplishes two things: 1) it eliminates all non-matching fact rows that were preserved by the summary, and 2) it retains all products rows with NULL padding of sum-of-sales for all non-matching product rows.

Significantly, the same rewrite could have been performed if the definition of the sales_summary had included an inner join instead of an outer join. However, the outer join in the rewritten query would not eliminate any non-matching fact rows, since the summary would not have any such rows.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing queries, the method comprising the steps of:
   receiving a query that does not reference a particular materialized view;
   said query requiring access to values from a particular column not contained in said materialized view;
   determining whether the particular materialized view satisfies each condition in a set of conditions, the set of conditions at least including a condition that said particular column is functionally dependent on a column that does belong to said materialized view; and
   if said materialized view satisfies each condition in said set of conditions, then rewriting said query to produce a rewritten query that references said materialized view and joins said materialized view back to a join-back table that contains said particular column.

2. The method of claim 1 wherein said particular column is a group by column specified in said query.

3. The method of claim 1 wherein:
   the rewritten query joins back to said join-back table based on a join-back key;
   the method further comprises the step of determining whether said join-back key contains unique values; and
   if said join-back key contains unique values, then rewriting said query by replacing references made in said particular query to a particular table with references to the materialized view.

4. The method of claim 1 wherein, if said join-back key does not contain unique values, then rewriting said query by performing the steps of:
   replacing references made in said particular query to said particular table with references to the materialized view; and
   replacing references made in said particular query to said join-back table with references to a view that extracts distinct values from said join-back key.

5. The method of claim 1 further comprising the steps of:
   storing, in a database, functional dependency metadata; and
   reading said functional dependency metadata to determine whether said particular column is functionally dependent on a column that does belong to said materialized view.

6. The method of claim 5 wherein the step of storing functional dependency metadata includes storing metadata that indicates a functional dependency between two columns of the same table.

7. A method of processing queries, the method comprising the steps of:
   receiving a query that does not reference a particular materialized aggregate view;
   said materialized aggregate view specifying an outer join between a child table and a parent table;
   said query specifying a particular type of join between said child table and said parent table, wherein said particular type of join is one of an inner join, an anti-join and a semi-join; and
   rewriting said query to produce a rewritten query that accesses said materialized aggregate view to produce data required by said query.

8. The method of claim 7 wherein:
   the particular type of join is one of either a semi-join and an inner join;
   the method further includes the step of using anti-join markers in the materialized view to filter anti-join rows from the materialized aggregate view to produce the data required by said query.

9. The method of claim 7 wherein:
   the particular type of join is an anti-join; and
   the method further includes the step of using anti-join markers in the materialized view to filter rows that are not anti-join rows from the materialized aggregate view to produce the data required by said query.

10. The method of claim 7 wherein the step of rewriting said query to produce a rewritten query that accesses said materialized aggregate view includes rewriting said query to use a scale factor to remove any effect, on aggregate values in said materialized aggregate view, of any duplicates produced by said outer join.

11. A method of processing queries, the method comprising the steps of:
    receiving a query that does not reference a particular materialized aggregate view;
    said materialized aggregate view specifying an inner join between a child table and a parent table;
    said query specifying a semi-join between said child table and said parent table; and
    rewriting said query to produce a rewritten query that accesses said materialized aggregate view to produce data required by said query.

12. The method of claim 11 wherein the step of rewriting said query to produce a rewritten query that accesses said materialized aggregate view includes the step of rewriting said query to use a scale factor to reduce any effect on aggregate values contained in said materialized aggregate view of any duplicates.

13. A method for processing queries, the method comprising the steps of:
    receiving a query that does not reference a particular materialized view;
    said query specifying that results are to be grouped by a first set of one or more columns;
    said materialized view reflecting data that is grouped by a second set of one or more columns;
    determining whether each column in said first set of columns either
    a) exactly matches a column in said second set of columns,
    b) is functionally dependent on another column in said first set of columns, or
    c) is functionally dependent on a column in said second set of columns;
    if each column in said first set of columns either exactly matches a column in said second set of columns, is functionally dependent on another column in said first set of columns, or is functionally dependent on a column in said second set of columns, then rewriting said query to produce a rewritten query that references said materialized view.

14. The method of claim 13 wherein the query includes a group by clause that specifies said first set of one or more columns, the method further comprising the steps of:
    determining whether all columns in said first set of one or more columns either
    a) match exactly with a column in said second set of one or more columns, or b) functionally depend on some other column in said first set of one or more columns;

if all columns in said first set of one or more columns either match exactly with a column in said second set of one or more columns or functionally depend on some other column in said first set of one or more columns, then rewriting said query to produce a rewritten query that does not include said group by clause.

15. The method of claim 13 further comprising the steps of:

determining whether a particular set of conditions is satisfied, said particular set of conditions including a condition that:
a) at least one column in the first set of one or more columns is functionally dependent on a column in the second set of one or more columns, or
b) there is at least one column in the second set of one or more columns that neither
b1) exactly matches any column in said first set of one or more columns, nor
b2) functionally depends on any other column in said second set of one or more columns;

if said particular set of conditions is satisfied, then rewriting said query to produce a rewritten query that rolls up values contained in said particular materialized view.

16. A computer-readable medium carrying one or more sequences of instructions for processing queries, wherein execution of the one or more sequences of instructions by one or more processors causes the one or more processors to perform the steps of:

receiving a query that does not reference a particular materialized view;

said query requiring access to values from a particular column not contained in said materialized view;

determining whether the particular materialized view satisfies each condition in a set of conditions, the set of conditions at least including a condition that said particular column is functionally dependent on a column that does belong to said materialized view; and if said materialized view satisfies each condition in said set of conditions, then rewriting said query to produce a rewritten query that references said materialized view and joins said materialized view back to a join-back table that contains said particular column.

17. The computer-readable medium of claim 16 wherein said particular column is a group by column specified in said query.

18. The computer-readable medium of claim 16 wherein:

the rewritten query joins back to said join-back table based on a join-back key;

the steps further comprise:
determining whether said join-back key contains unique values; and
if said join-back key contains unique values, then rewriting said query by replacing references made in said particular query to a particular table with references to the materialized view.

19. The computer-readable medium of claim 16, wherein the steps further include:

if said join-back key does not contain unique values, then rewriting said query by performing the following steps of:
replacing references made in said particular query to said particular table with references to the materialized view; and replacing references made in said particular query to said join-back table with references to a view that extracts distinct values from said join-back key.

20. The computer-readable medium of claim 16, wherein the steps further comprise:

storing, in a database, functional dependency metadata; and reading said functional dependency metadata to determine whether said particular column is functionally dependent on a column that does belong to said materialized view.

21. The computer-readable medium of claim 20 wherein the step of storing functional dependency metadata includes storing metadata that indicates a functional dependency between two columns of the same table.

22. A computer-readable medium carrying one or more sequences of instructions for processing queries, wherein execution of the one or more sequences of instructions by one or more processors causes the one or more processors to perform the steps of:

receiving a query that does not reference a particular materialized aggregate view;

said materialized aggregate view specifying an outer join between a child table and a parent table;

said query specifying a particular type of join between said child table and said parent table, wherein said particular type of join is one of an inner join, an anti-join and a semi-join; and rewriting said query to produce a rewritten query that accesses said materialized aggregate view to produce data required by said query.

23. The computer-readable medium of claim 22 wherein:

the particular type of join is one of either a semi-join and an inner join;

the steps further include using anti-join markers in the materialized view to filter anti-join rows from the materialized aggregate view to produce the data required by said query.

24. The method of claim 22 wherein:

the particular type of join is an anti-join; and the steps further include using anti-join markers in the materialized view to filter rows that are not anti-join rows from the materialized aggregate view to produce the data required by said query.

25. The computer-readable medium of claim 22, wherein the step of rewriting said query to produce a rewritten query that accesses said materialized aggregate view includes rewriting said query to use a scale factor to remove any effect, on aggregate values in said materialized aggregate view, of any duplicates produced by said outer join.

26. A computer-readable medium carrying one or more sequences of instructions for processing queries, wherein execution of the one or more sequences of instructions by one or more processors causes the one or more processors to perform the steps of:

receiving a query that does not reference a particular materialized aggregate view;

said materialized aggregate view specifying an inner join between a child table and a parent table;

said query specifying a semi-join between said child table and said parent table; and rewriting said query to produce a rewritten query that accesses said materialized aggregate view to produce data required by said query.

27. The computer-readable medium of claim 26, wherein the step of rewriting said query to produce a rewritten query that accesses said materialized aggregate view includes the step of rewriting said query to use a scale factor to reduce any effect on aggregate values contained in said materialized aggregate view of any duplicates.

28. A computer-readable medium carrying one or more sequences of instructions for processing queries, wherein execution of the one or more sequences of instructions by one or more processors causes the one or more processors to perform the steps of:
  receiving a query that does not reference a particular materialized view;
  said query specifying that results are to be grouped by a first set of one or more columns;
  said materialized view reflecting data that is grouped by a second set of one or more columns;
  determining whether each column in said first set of columns either
    a) exactly matches a column in said second set of columns,
    b) is functionally dependent on another column in said first set of columns, or
    c) is functionally dependent on a column in said second set of columns;
  if each column in said first set of columns either exactly matches a column in said second set of columns, is functionally dependent on another column in said first set of columns, or is functionally dependent on a column in said second set of columns, then rewriting said query to produce a rewritten query that references said materialized view.

29. The computer-readable medium of claim 28, wherein the query includes a group by clause that specifies said first set of one or more columns, wherein the steps further comprise:
  determining whether all columns in said first set of one or more columns either
    a) match exactly with a column in said second set of one or more columns, or
    b) functionally depend on some other column in said first set of one or more columns;
  if all columns in said first set of one or more columns either match exactly with a column in said second set of one or more columns or functionally depend on some other column in said first set of one or more columns, then rewriting said query to produce a rewritten query that does not include said group by clause.

30. The computer-readable medium of claim 28, the steps further comprising:
  determining whether a particular set of conditions is satisfied, said particular set of conditions including a condition that:
    a) at least one column in the first set of one or more columns is functionally dependent on a column in the second set of one or more columns, or
    b) there is at least one column in the second set of one or more columns that neither
      b1) exactly matches any column in said first set of one or more columns, nor
      b2) functionally depends on any other column in said second set of one or more columns;
  if said particular set of conditions is satisfied, then rewriting said query to produce a rewritten query that rolls up values contained in said particular materialized view.

* * * * *